United States Patent
Ma et al.

(10) Patent No.: US 11,763,729 B2
(45) Date of Patent: Sep. 19, 2023

(54) SIGNAL PROCESSING METHOD AND DEVICES, AND DISPLAY APPARATUS

(71) Applicant: BOE TECHNOLOGY GROUP CO., LTD., Beijing (CN)

(72) Inventors: Xitong Ma, Beijing (CN); Lihua Geng, Beijing (CN); Congrui Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 45 days.

(21) Appl. No.: 17/638,123

(22) PCT Filed: Jan. 22, 2021

(86) PCT No.: PCT/CN2021/073298
§ 371 (c)(1),
(2) Date: Feb. 24, 2022

(87) PCT Pub. No.: WO2022/155889
PCT Pub. Date: Jul. 28, 2022

(65) Prior Publication Data
US 2023/0162661 A1    May 25, 2023

(51) Int. Cl.
*G09G 5/12*    (2006.01)
*G09G 3/294*    (2013.01)

(52) U.S. Cl.
CPC ............ *G09G 3/2946* (2013.01); *G09G 5/12* (2013.01); *G09G 2320/0693* (2013.01)

(58) Field of Classification Search
CPC .................. G09G 5/12; G09G 3/2946; G09G 2320/0693; H04N 5/08; H04N 5/04; H04N 5/06
See application file for complete search history.

(56) References Cited

U.S. PATENT DOCUMENTS

| | | | |
|---|---|---|---|
| 5,686,968 A * | 11/1997 | Ujiie | H04N 5/06 348/521 |
| 5,828,678 A | 10/1998 | Mock | |
| 9,425,810 B2 * | 8/2016 | Ma | H03L 7/183 |

(Continued)

FOREIGN PATENT DOCUMENTS

| | | |
|---|---|---|
| CN | 1487739 A | 4/2004 |
| CN | 101964181 A | 2/2011 |

(Continued)

*Primary Examiner* — Olga V Merkoulova
(74) *Attorney, Agent, or Firm* — IP&T Group LLP

(57) ABSTRACT

A method includes: obtaining a first frame synchronization signal, period between a trailing edge of a first pulse and a leading edge of a next first pulse being first time period corresponding to a first integer number of pulses of a first pixel clock signal; generating a synchronization calibration signal, a triggering edge of the second pulse being delayed compared to a trailing edge of a first pulse; generating a second frame synchronization signal, period between a triggering edge of the second pulse and a leading edge of a third pulse being second time period. When ratio of frequency of the second pixel clock signal to frequency of the first pixel clock signal is within threshold range, the second time period corresponds to a second integer number of pulses of the second pixel clock signal. The second integer is integer value of product of the first integer and ratio.

20 Claims, 14 Drawing Sheets

(56) References Cited

U.S. PATENT DOCUMENTS

| | | | |
|---|---|---|---|
| 11,582,368 B2* | 2/2023 | Ma | ................. H04N 5/08 |
| 2003/0164897 A1 | 9/2003 | Chen et al. | |
| 2011/0018887 A1 | 1/2011 | Uchiyama | |
| 2012/0303994 A1 | 11/2012 | Bauernfeind et al. | |
| 2012/0307141 A1 | 12/2012 | Millet et al. | |
| 2015/0236708 A1* | 8/2015 | Ma | ................. H03L 7/193 |
| | | | 327/156 |
| 2022/0400190 A1* | 12/2022 | Ma | ................. H04N 21/43632 |

FOREIGN PATENT DOCUMENTS

| | | |
|---|---|---|
| CN | 103647918 A | 3/2014 |
| CN | 103650406 A | 3/2014 |
| CN | 111083547 A | 4/2020 |

\* cited by examiner

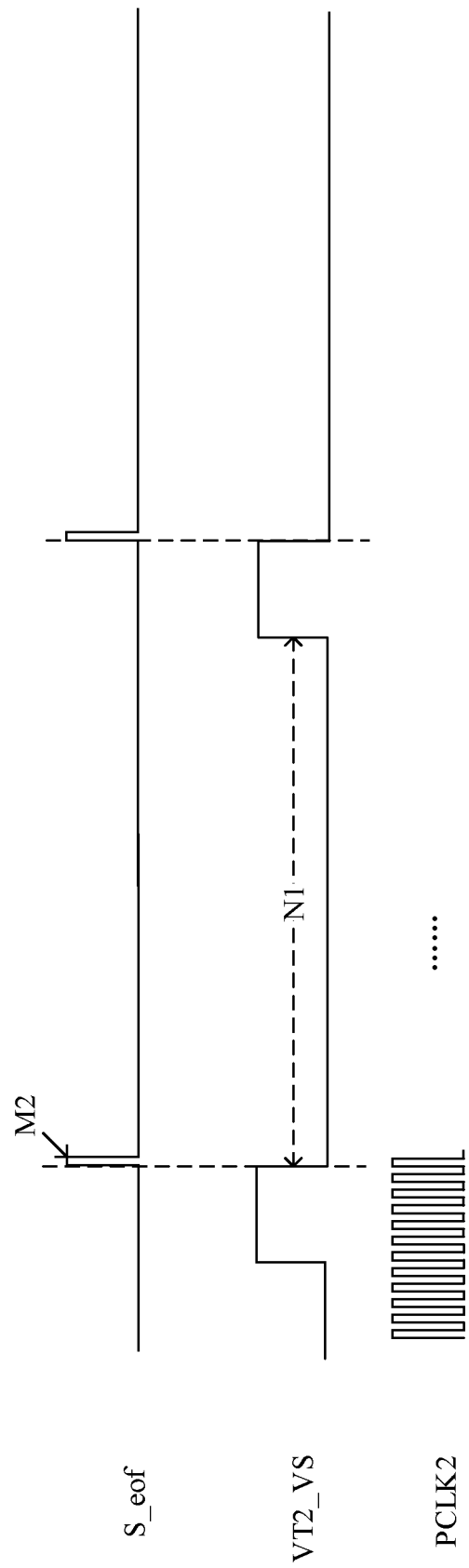

SIGNAL PROCESSING METHOD AND DEVICES, AND DISPLAY APPARATUS

CROSS-REFERENCE TO RELATED APPLICATION

This application is a national phase entry under 35 USC 371 of International Patent Application No. PCT/CN2021/073298 filed on Jan. 22, 2021, which is incorporated herein by reference in its entirety.

TECHNICAL FIELD

The present disclosure relates to the field of display technologies, and in particular, to a signal processing method and devices, and a display apparatus.

BACKGROUND

With the popularity of display products, requirements for display effects of display products are getting higher and higher. For example, in a process in which a display product displays images, it is not desirable to derive a new image, so that the images may be restituted more realistically.

SUMMARY

In one aspect, a signal processing method is provided. The signal processing method includes: obtaining a first frame synchronization signal, the first frame synchronization signal including a plurality of first pulses, a period between a trailing edge of a first pulse and a leading edge of a next first pulse of the first pulse being a first time period, and the first time period corresponding to a first integer number of pulses of a first pixel clock signal; generating a synchronization calibration signal, the synchronization calibration signal including a plurality of second pulses, a width of a second pulse being equal to a pulse width of a second pixel clock signal, a triggering edge of the second pulse being delayed compared to a trailing edge of a first pulse closest thereto, and a delay time being less than or equal to a sum of a pulse width of the first pixel clock signal and a clock cycle of the second pixel clock signal; and generating a second frame synchronization signal, the second frame synchronization signal including a plurality of third pulses, a period between a triggering edge of each second pulse and a leading edge of a third pulse closest to the second pulse and after the second pulse being a second time period. In a case where a ratio of a frequency of the second pixel clock signal to a frequency of the first pixel clock signal is within a threshold range, the second time period corresponds to a second integer number of pulses of the second pixel clock signal; and the second integer is an integer value of a product of the first integer and the ratio.

In some embodiments, the threshold range is from 0.9 to 1.1, inclusive, and does not contain 1.

In some embodiments, in a case where the ratio of the frequency of the second pixel clock signal to the frequency of the first pixel clock signal is 1, the second time period corresponds to a first integer number of pulses of the second pixel clock signal.

In some embodiments, generating the second frame synchronization signal, includes: generating a third frame synchronization signal, a period between the triggering edge of each second pulse and a leading edge of a pulse, closest to the second pulse and after the second pulse, of the third frame synchronization signal corresponding to the second integer number of pulses of the second pixel clock signal; generating a fourth frame synchronization signal, a period between the triggering edge of each second pulse and a leading edge of a pulse, closest to the second pulse and after the second pulse, of the fourth frame synchronization signal corresponding to a first integer number of pulses of the second pixel clock signal; and selecting one of the third frame synchronization signal and the fourth frame synchronization signal as the second frame synchronization signal.

Selecting one of the third frame synchronization signal and the fourth frame synchronization signal as the second frame synchronization signal, includes: selecting the third frame synchronization signal as the second frame synchronization signal in a case where a first condition is met, the first condition being that the ratio of the frequency of the second pixel clock signal to the frequency of the first pixel clock signal is within the threshold range that does not contain 1, or a ratio of a second frame rate of a display module to a first frame rate of a first video signal is within the threshold range that does not contain 1; and selecting the fourth frame synchronization signal as the second frame synchronization signal in a case where a second condition is met, the second condition being that the frequency of the first pixel clock signal is equal to the frequency of the second pixel clock signal, or the first frame rate of the first video signal is equal to the second frame rate of the display module.

In some embodiments, the signal processing method further includes detecting the first frame rate of the obtained first video signal; and obtaining the second frame rate of the display module.

In some embodiments, generating the third frame synchronization signal, includes: counting a number of pulses of the second pixel clock signal; generating the leading edge of the pulse of the third frame synchronization signal in a case where the number of pulses of the second pixel clock signal reaches the second integer; and generating a trailing edge of the pulse of the third frame synchronization signal.

Generating the trailing edge of the pulse of the third frame synchronization signal, includes: generating the trailing edge of the pulse of the third frame synchronization signal, and returning to perform an operation of counting the number of pulses of the second pixel clock signal in response to the triggering edge of the second pulse, in a case where the number of pulses of the second pixel clock signal does not reach a third integer, the third integer being greater than the second integer; or generating the trailing edge of the pulse of the third frame synchronization signal, and returning to perform an operation of counting the number of pulses of the second pixel clock signal in response to a case where the number of pulses of the second pixel clock signal reaches a third integer, the third integer being greater than the second integer; and re-returning to perform the operation of counting the number of pulses of the second pixel clock signal in response to the triggering edge of the second pulse.

In some embodiments, generating the fourth frame synchronization signal, includes: counting a number of pulses of the second pixel clock signal; generating the leading edge of the pulse of the fourth frame synchronization signal in a case where the number of pulses of the second pixel clock signal reaches the first integer; and generating a trailing edge of the pulse of the fourth frame synchronization signal.

Generating the trailing edge of the pulse of the fourth frame synchronization signal, includes: generating the trailing edge of the pulse of the fourth frame synchronization signal, and returning to perform an operation of counting the number of pulses of the second pixel clock signal in response to the triggering edge of the second pulse, in a case where the number of pulses of the second pixel clock signal does not reach a fourth integer, the fourth integer being greater than the first integer; or generating the trailing edge of a pulse of the second frame synchronization signal, and returning to perform an operation of counting the number of pulses of the second pixel clock signal in response to a case where the number of pulses of the second pixel clock signal reaches a fourth integer, the fourth integer being greater than the first integer; and re-returning to perform the operation of counting the number of pulses of the second pixel clock signal in response to the triggering edge of the second pulse.

In some embodiments, generating the synchronization calibration signal, includes: generating a calibration signal, the calibration signal including a plurality of fourth pulses, one of a leading edge and a trailing edge of a fourth pulse being at a same time as a trailing edge of a first pulse, and a width of the fourth pulse being equal to the pulse width of the first pixel clock signal; and obtaining the synchronization calibration signal according to the calibration signal, the second pulses of the synchronization calibration signal being delayed compared to the fourth pulses of the calibration signal, and a delay time being less than or equal to the clock cycle of the second pixel clock signal.

In some embodiments, obtaining the synchronization calibration signal according to the calibration signal, includes: generating a first signal, a leading edge of a pulse of the first signal being at a same time as a trailing edge of the fourth pulse of the calibration signal; generating a second signal, pulses of the second signal being delayed by a third time period compared to pulses of the first signal, and the third time period being less than or equal to the clock cycle of the second pixel clock signal; generating a third signal, pulses of the third signal being delayed by a fourth time period compared to the pulses of the second signal, and the fourth time period being equal to the pulse width of the second pixel clock signal; and obtaining the synchronization calibration signal according to the second signal and the third signal.

In some embodiments, obtaining the synchronization calibration signal according to the second signal and the third signal, includes performing a first logic operation on the second signal and the third signal to obtain the synchronization calibration signal.

In some embodiments, the first logic operation is an exclusive OR operation.

In some embodiments, generating the calibration signal, includes: generating a fourth signal, the fourth signal and the first frame synchronization signal being mutually inverted signals; generating a fifth signal, the fifth signal being delayed by the pulse width of the first pixel clock signal compared to the first frame synchronization signal; and obtaining the calibration signal according to the fourth signal and the fifth signal.

In some embodiments, obtaining the calibration signal according to the fourth signal and the fifth signal, includes performing a second logic operation on the fourth signal and the fifth signal to obtain the calibration signal.

In some embodiments, the second logic operation is an AND operation.

In some embodiments, obtaining the first frame synchronization signal, includes obtaining a first video signal, the first video signal including the first frame synchronization signal and video data.

In some embodiments, the signal processing method further includes: writing the video data into a storage device; reading the video data in the storage device to obtain a second video signal according to the second frame synchronization signal, the second video signal including the second frame synchronization signal and the video data; and outputting the second video signal.

In another aspect, a signal processing device is provided. The signal processing device includes: a signal input unit, a first processing unit and a second processing unit. The signal input unit is configured to obtain a first frame synchronization signal. The first frame synchronization signal includes a plurality of first pulses, and a period between a trailing edge of a first pulse and a leading edge of a next first pulse of the first pulse is a first time period, and the first time period corresponds to a first integer number of pulses of a first pixel clock signal.

The first processing unit is configured to generate a synchronization calibration signal. The synchronization calibration signal includes a plurality of second pulses, and a width of a second pulse is equal to a pulse width of a second pixel clock signal; a triggering edge of the second pulse is delayed compared to a trailing edge of a first pulse closest thereto, and a delay time is less than or equal to a sum of a pulse width of the first pixel clock signal and a clock cycle of the second pixel clock signal.

The second processing unit is configured to generate a second frame synchronization signal. The second frame synchronization signal includes a plurality of third pulses; a period between a triggering edge of each second pulse and a leading edge of a third pulse closest to the second pulse and after the second pulse is a second time period. In a case where a ratio of a frequency of the second pixel clock signal to a frequency of the first pixel clock signal is within a threshold range, the second time period corresponds to a second integer number of pulses of the second pixel clock signal, and the second integer is an integer value of a product of the first integer and the ratio; and in a case where the ratio of the frequency of the second pixel clock signal to the frequency of the first pixel clock signal is 1, the second time period corresponds to a first integer number of pulses of the second pixel clock signal.

In some embodiments, the second processing unit includes: a first signal processing unit, a second signal processing unit and a gating unit. The first signal processing unit is configured to generate a third frame synchronization signal. A period between the triggering edge of each second pulse and a leading edge of a pulse, closest to the second pulse and after the second pulse, of the third frame synchronization signal corresponds to the second integer number of pulses of the second pixel clock signal.

The second signal processing unit is configured to generate a fourth frame synchronization signal. A period between the triggering edge of each second pulse and a leading edge of a pulse, closest to the second pulse and after the second pulse, of the fourth frame synchronization signal corresponds to the first integer number of pulses of the second pixel clock signal.

The gating unit is configured to select the third frame synchronization signal as the second frame synchronization signal in a case where a first condition is met, and to select the fourth frame synchronization signal as the second frame synchronization signal in a case where a second condition is met. The first condition is that the ratio of the frequency of the second pixel clock signal to the frequency of the first pixel clock signal is within the threshold range, or a ratio of a second frame rate of a display module to a first frame rate of a first video signal is within the threshold range; and the second condition is that the frequency of the first pixel clock signal is equal to the frequency of the second pixel clock signal, or the first frame rate of the first video signal is equal to the second frame rate of the display module.

In some embodiments, the signal input unit is configured to obtain the first video signal, the first video signal including the first frame synchronization signal and video data.

In some embodiments, the signal processing device further includes: a detection unit, an acquisition unit, a data writing unit, a data reading unit and a signal output unit. The detection unit is configured to detect the first frame rate of the obtained first video signal. The acquisition unit is configured to obtain the second frame rate of the display module. The data writing unit is configured to write the video data in the first video signal into a storage device. The data reading unit is configured to read the video data in the storage device to obtain a second video signal according to the second frame synchronization signal; the second video signal includes the second frame synchronization signal and the video data. The signal output unit is configured to output the second video signal.

In yet another aspect, a signal processing device is provided. The signal processing device includes a memory and a processor. One or more computer programs are stored in the memory. The processor is coupled to the memory; and the processor is configured to execute the one or more computer programs to cause the processor to implement the signal processing method as described in any one of the above embodiments.

In yet another aspect, a signal processing device is provided. The signal processing device is a chip. The chip is configured to implement the signal processing method as described in any one of the above embodiments.

In yet another aspect, a display apparatus is provided. The display apparatus includes a display module and a signal processing device coupled to the display module. The signal processing device is configured to: obtain a first frame synchronization signal, the first frame synchronization signal including a plurality of first pulses, wherein a period between a trailing edge of a first pulse and a leading edge of a next first pulse of the first pulse is a first time period, and the first time period corresponds to a first integer number of pulses of a first pixel clock signal; generate a synchronization calibration signal, the synchronization calibration signal including a plurality of second pulses, wherein a width of a second pulse is equal to a pulse width of a second pixel clock signal; a triggering edge of the second pulse is delayed compared to a trailing edge of a first pulse closest thereto, and a delay time is less than or equal to a sum of a pulse width of the first pixel clock signal and a clock cycle of the second pixel clock signal; generate a second frame synchronization signal, the second frame synchronization signal including a plurality of third pulses, wherein a period between a triggering edge of each second pulse and a leading edge of a third pulse closest to the second pulse and after the second pulse is a second time period; and output a second video signal to the display module. In a case where a ratio of a frequency of the second pixel clock signal to a frequency of the first pixel clock signal is within a threshold range, the second time period corresponds to a second integer number of pulses of the second pixel clock signal, and the second integer is an integer value of a product of the first integer and the ratio; and in a case where the ratio of the frequency of the second pixel clock signal to the frequency of the first pixel clock signal is 1, the second time period corresponds to a first integer number of pulses of the second pixel clock signal.

In some embodiments, the display apparatus further includes a storage device. The storage device is coupled to the signal processing device. The storage device is configured to store video data in a first video signal.

In yet another aspect, a non-transitory computer-readable storage medium is provided. The computer-readable storage medium has stored computer program instructions that, when executed by a computer, cause the computer to execute the signal processing method as described in any one of the above embodiments.

In yet another aspect, a computer program product is provided. The computer program product includes computer program instructions that, when run on a computer, cause the computer to execute the signal processing method as described in any one of the above embodiments.

In yet another aspect, a computer program is provided. When executed on a computer, the computer program causes the computer to execute the signal processing method as described in any one of the above embodiments.

BRIEF DESCRIPTION OF THE DRAWINGS

In order to describe technical solutions in the present disclosure more clearly, the accompanying drawings to be used in some embodiments of the present disclosure will be introduced briefly below. However, the accompanying drawings to be described below are merely accompanying drawings of some embodiments of the present disclosure, and a person of ordinary skill in the art can obtain other drawings according to these drawings. In addition, the accompanying drawings to be described below may be regarded as schematic diagrams, but are not limitations on actual sizes of products, actual processes of methods and actual timings of signals to which the embodiments of the present disclosure relate.

FIG. 12A is yet another signal timing diagram of a signal processing method, in accordance with some embodiments;

DETAILED DESCRIPTION

Figure 1:
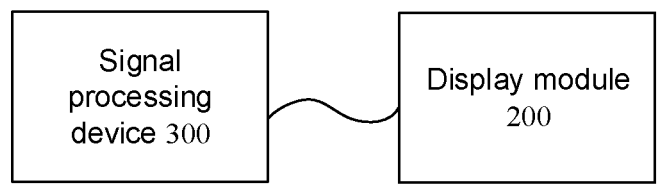
FIG. 1 is a block diagram of a display apparatus, in accordance with some embodiments.

Technical solutions in some embodiments of the present disclosure will be described clearly and completely below with reference to the accompanying drawings. However, the described embodiments are merely some but not all embodiments of the present disclosure. All other embodiments obtained on a basis of the embodiments of the present disclosure by a person of ordinary skill in the art shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to." In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Below, the terms such as "first" and "second" are only used for descriptive purposes, and are not to be construed as indicating or implying relative importance or implicitly indicating the number of indicated technical features. Thus, a feature defined by "first" or "second" may explicitly or implicitly include one or more of the features. In the description of the embodiments of the present disclosure, the term "a plurality of/the plurality of" means two or more unless otherwise specified.

In the description of some embodiments, the terms "coupled" and "connected" and their derivatives may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

As used herein, the term "if" is optionally construed as "when" or "in a case where" or "in response to determining that" or "in response to detecting", depending on the context. Similarly, the phrase "if it is determined that" or "if [a stated condition or event] is detected" is optionally construed as "in a case where it is determined that" or "in response to determining that" or "in a case where [the stated condition or event] is detected" or "in response to detecting [the stated condition or event]", depending on the context.

The use of the phrase "applicable to" or "configured to" herein means an open and inclusive language, which does not exclude devices that are applicable to or configured to perform additional tasks or steps.

As used herein, terms such as "about" or "approximately" includes a stated value and an average value within an acceptable range of deviation of a particular value. The acceptable range of deviation is determined by a person of ordinary skill in the art in view of the measurement in question and the error associated with the measurement of a particular quantity (i.e., the limitations of the measurement system).

Embodiments of the present disclosure provide a display apparatus. For example, the display apparatus may be any apparatus that displays an image whether moving (e.g., a video) or stationary (e.g., a static image), and whether textual or graphical. For example, the display apparatus may be one of a variety of electronic apparatuses, and the described embodiments may be implemented in or associated with the variety of electronic apparatuses. The variety of electronic apparatuses are, for example (but not limit to), mobile telephones, wireless devices, personal data assistants (PADs), hand-held or portable computers, global positioning system (GPS) receivers/navigators, cameras, MPEG-4 Part 14 (MP4) video players, video cameras, game consoles, watches, clocks, calculators, TV monitors, flat-panel displays, computer monitors, automobile displays (e.g., odometer displays), navigators, cockpit controllers and/or displays, camera view displays (e.g., displays of rear view camera in vehicles), electronic photos, electronic billboards or signs, projectors, architectural structures, and packagings and aesthetic structures (e.g., a display for an image of a piece of jewelry), etc. Embodiments of the present disclosure do not particularly limit a specific form of the display apparatus.

In some embodiments, as shown in FIG. 1, the display apparatus 100 includes a display module 200 and a signal processing device 300. The display module 200 is coupled to the signal processing device 300.

Figure 2:
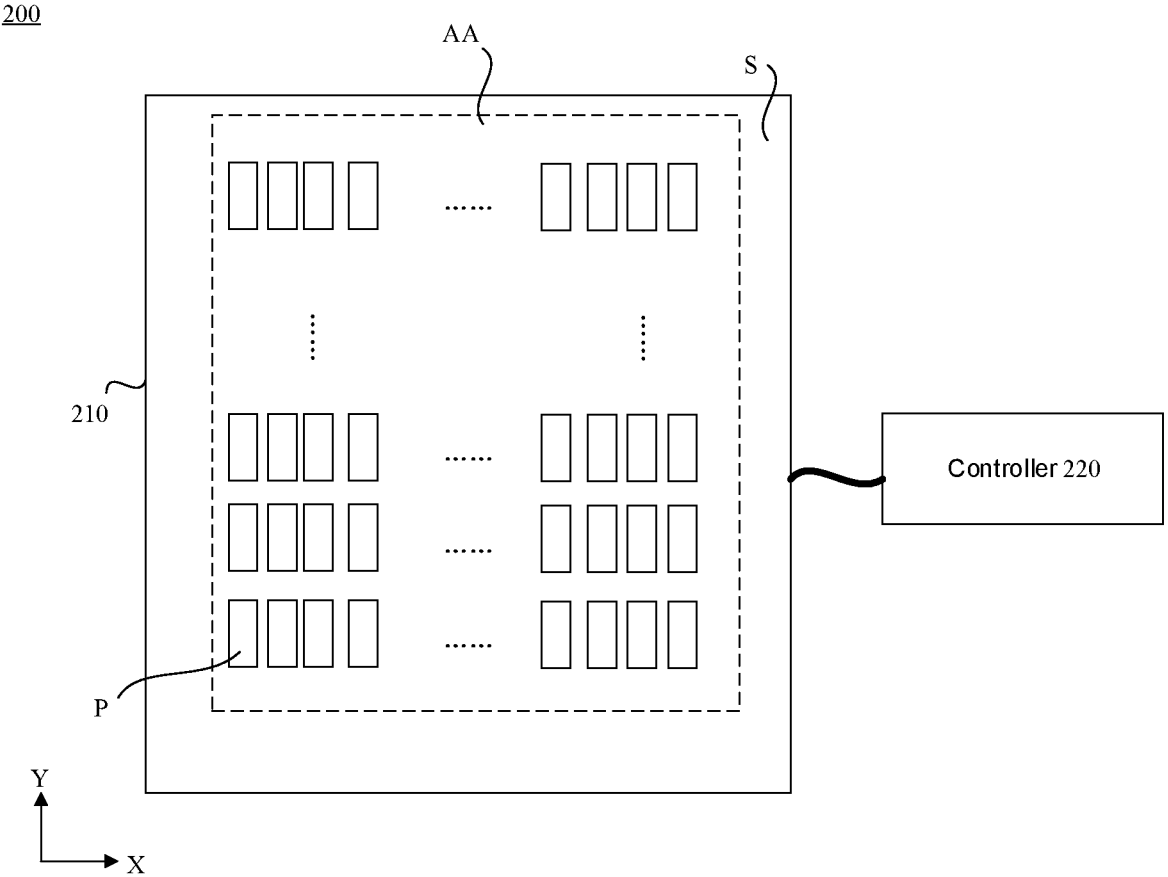
FIG. 2 is a structural diagram of a display module, in accordance with some embodiments.

For example, as shown in FIG. 2, the display module 200 includes a display panel 210. For example, the display panel may be a liquid crystal display (LCD) panel, or a self-luminous display panel, such as a display panel based on organic light-emitting diodes (OLEDs), or a display panel based on light-emitting diodes (LEDs). For example, in a case where the display panel is the LCD panel, the display module further includes a backlight module.

For example, as shown in FIG. 2, the display panel 210 has an active area AA and a peripheral area S. The peripheral area S is located on at least one side outside the AA. The display panel 200 includes a plurality of pixels P disposed in the AA. For example, the plurality of pixels P may be arranged in an array. For example, pixels arranged in a line along an X direction (a horizontal direction) in FIG. 2 are referred to as a row of pixels, and pixels arranged in a line along a Y direction (a vertical direction) in FIG. 2 are referred to as a column of pixels. For example, each pixel includes a plurality of sub-pixels, and the plurality of sub-pixels include a sub-pixel with a first color, a sub-pixel with a second color and a sub-pixel with a third color. For example, the first color, the second color and the third color are three primary colors. For example, the first color, the second color and the third color are red, green and blue, respectively. That is, the plurality of sub-pixels include a red sub-pixel, a green sub-pixel and a blue sub-pixel.

The signal processing device is configured to receive a first video signal and output a second video signal. The display module is configured to display images corresponding to the second video signal according to the second video signal from the signal processing device.

For example, the display apparatus may have a video signal input interface to receive a video signal. For example, the video signal input interface may be a serial digital interface (SDI), a high definition multimedia interface (HDMI) or a display port (DP). For example, the video signal input interface may be included in the signal processing device.

For example, the video signal includes a timing signal and video data. The timing signal includes synchronization signals and an enable signal (i.e., a valid data strobe signal or a data enable signal), and the synchronization signals include a horizontal synchronization signal and a frame synchronization signal (i.e., a vertical synchronization signal). For example, the first video signal includes a first timing signal and video data, the first timing signal includes first synchronization signals and a first enable signal, and the first synchronization signals include a first frame synchronization signal and a first horizontal synchronization signal; and the second video signal includes a second timing signal and the video data, the second timing signal includes second synchronization signals and a second enable signal, and the second synchronization signals include a second frame synchronization signal and a second horizontal synchronization signal.

The horizontal synchronization signal generally selects an effective row signal interval for the display panel, and the frame synchronization signal generally selects an effective vertical signal interval for the display panel. For example, due to a combined action of the horizontal synchronization signal and the frame synchronization signal, an interval of effective video data corresponding to the display panel may be selected.

It will be understood that, in the video signal, the valid video data (valid RGB data) only occupies a portion of a video signal cycle, and horizontal blanking and vertical blanking intervals of the video signal do not contain the valid video data. Therefore, when relevant circuits in the display apparatus process the video signal, an interval containing the valid video data may be distinguished from the blanking intervals not containing the valid video data through the enable signal. Both the horizontal synchronization signal and the frame synchronization signal should be matched with the enable signal. For example, in a process in which the horizontal synchronization signal acts on pixels, e.g., in a process in which the horizontal synchronization signal drives pixel circuits in the pixels, a portion of the enable signal corresponding to the horizontal synchronization signal is matched with the horizontal synchronization signal; and in a process in which the frame synchronization signal acts on pixels, e.g., in a process in which the frame synchronization signal drives pixel circuits in the pixels, a portion of the enable signal corresponding to the frame synchronization signal is matched with the frame synchronization signal. In this way, it ensures that the display panel may effectively display images corresponding to the video signal.

For example, as shown in FIG. 2, the display module 200 further includes a controller 220. For example, the controller may be a timing controller (TCON). The controller 220 is coupled to the display panel 210. The controller is configured to receive the second video signal from the signal processing device and control the display panel to display images corresponding to the second video signal. For example, the display module further includes a driver chip (driver IC). The driver chip is bonded to the display panel, and the driver chip is coupled to the controller. In this case, the signal processing device transmits the second video signal to the controller, and the controller outputs a control signal to the driver chip, and the driver chip outputs a driving signal to the display panel according to the control signal, so as to drive the display panel to display images corresponding to the video data in the second video signal.

Figure 3:
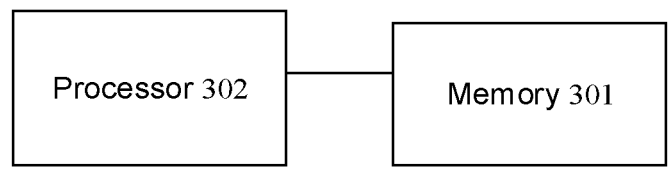
FIG. 3 is a block diagram of a signal processing device, in accordance with some embodiments.

Embodiments of the present disclosure provide a signal processing device. As shown in FIG. 3, the signal processing device includes a memory 301 and a processor 302. The memory 301 is coupled to the processor 302.

The memory 301 has stored therein one or more computer programs that are executable on the processor 302. When the processor 302 executes the computer program, the computer program causes the processor 302 to implement a signal processing method as described in any one of the following embodiments.

For example, the processor 302 may be a single processor, or may be a general term for a plurality of processing elements. For example, the processor 302 may be a general-purpose central processing unit (CPU), a microprocessor, an application specific integrated circuit (ASIC), or one or more integrated circuits for controlling execution of the programs of the solutions of the present disclosure, such as one or more microprocessors. For example, the memory 301 may be a single memory, or a general term for a plurality of storage elements, and is used to store executable program codes or the like. Moreover, the memory 301 may be a random access memory (RAM) or a non-volatile memory, such as a disk memory, a flash memory, etc.

The memory 301 is used for storing application program codes for executing the solutions of the present disclosure, and the execution is performed by the processor 302. The processor 302 is used to execute the application program codes stored in the memory 301 to implement the signal processing method provided by any of the following embodiments of the present disclosure.

Figure 4:
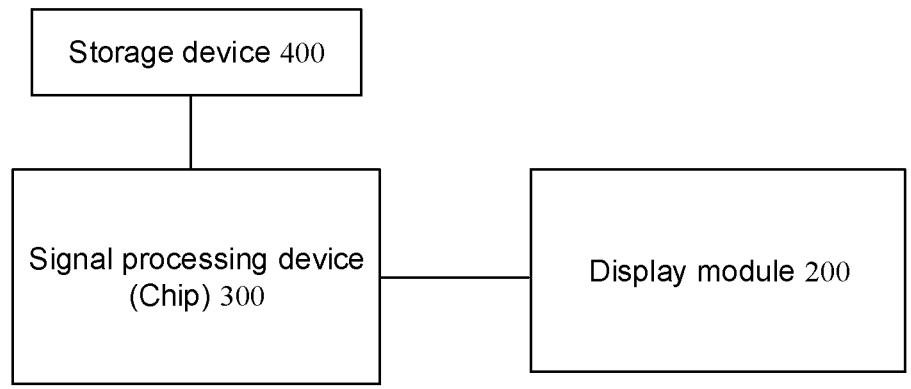
FIG. 4 is a block diagram of another display apparatus, in accordance with some embodiments.

Embodiments of the present disclosure provide a signal processing device. As shown in FIG. 4, the signal processing device 300 may be a chip. The chip is configured to implement a signal processing method as described in any one of the following embodiments. For example, the chip may be a programmable device, such as a complex programmable logic device (CPLD), an erasable programmable logic device (EPLD) or a field programmable gate array (FPGA).

In some embodiments, as shown in FIG. 4, the display apparatus 100 further includes a storage device 400. The storage device 400 is coupled to the signal processing device 300. The storage device 400 is configured to store the video data in the first video signal. For example, the storage device 400 may be located in the signal processing device 300. For example, the storage device may be a random access memory, such as a double data rate synchronous dynamic random access memory (DDR SDRAM). For example, the storage device is a DDR3 SDRAM.

Figure 5:
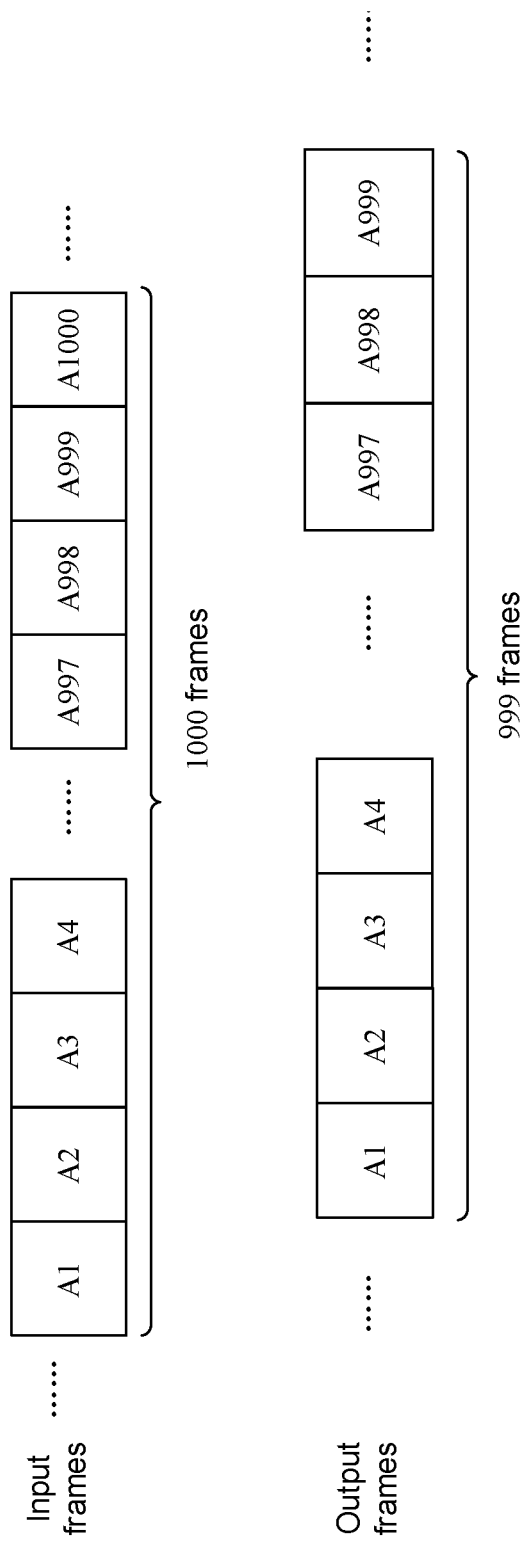
FIG. 5 is a diagram showing a transmission process of a video signal, in accordance with some embodiments.

In the related art, there is a deviation between a frame rate (e.g., a first frame rate) of a video signal received by a signal processing device in a display apparatus and a frame rate (e.g., a second frame rate) of a display module in the display apparatus. For example, the frame rate of the video signal received by the signal processing device is 60/1.001 Hz, i.e., 59.94 Hz, and the frame rate of the display module is 60 Hz. The two frame rates are close but there is still a small error therebetween, and thus there is a small error between each input frame and a corresponding output frame. This small error will always be accumulating, and thus in a case where input frames are 1000 frames, corresponding output frames are 999 frames (referring to FIG. 5), resulting in that the input frames and the output frames differ by a whole frame. In this case, the video signal input to the signal processing device and a video signal output from the signal processing device are not synchronized, that is, the input frame and the output frame of the signal processing device are not synchronized, which may easily cause frame skipping or frame missing of display, and reduce a display effect. For example, for a display apparatus with high requirements for displaying images, such as a monitor, an authenticity of a display may be reduced.

Embodiments of the present disclosure provide a signal processing method. For example, the signal processing method is applied to a signal processing device, such as the signal processing device 300 in FIGS. 1, 3 and 4. The signal processing method includes S10 to S30.

Figure 6:
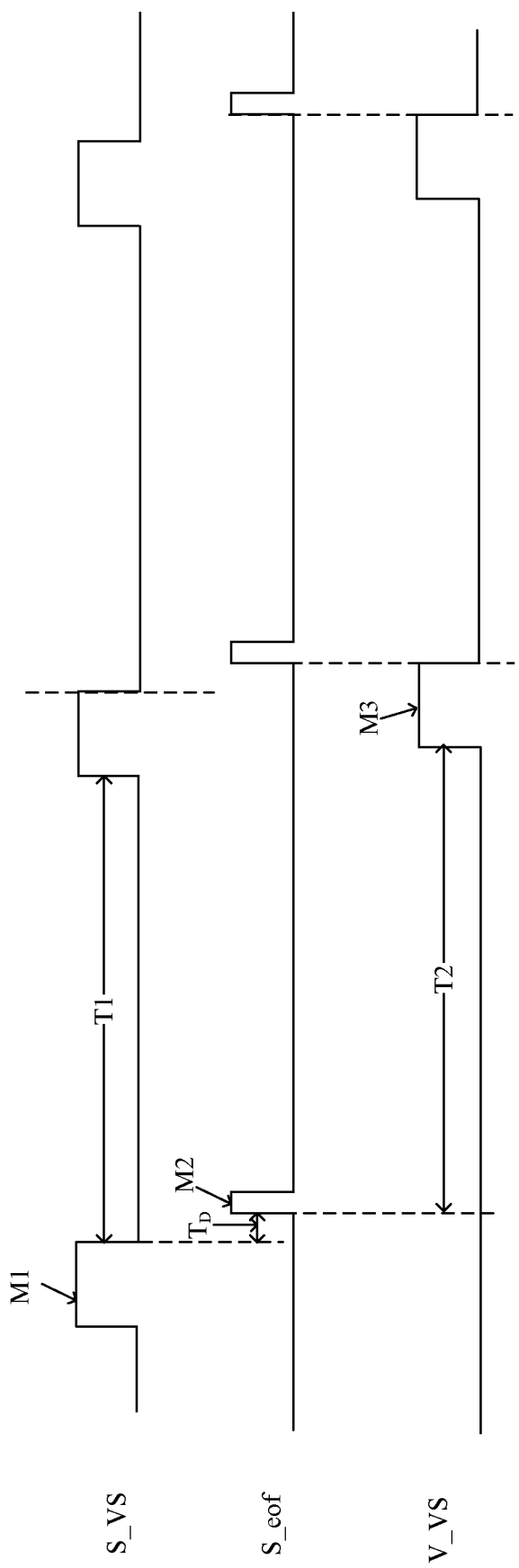
FIG. 6 is a signal timing diagram of a signal processing method, in accordance with some embodiments.

In S10, a first frame synchronization signal is obtained. Referring to FIG. 6, the first frame synchronization signal S_VS includes a plurality of first pulses M1. A period between a trailing edge of a first pulse and a leading edge of a next first pulse of the first pulse is a first time period T1, and the first time period corresponds to a first integer number of pulses of a first pixel clock signal.

For example, obtaining the first frame synchronization signal, includes obtaining a first video signal. The first video signal includes a first frame synchronization signal and video data. It will be understood that the video data includes pixel data, such as display gray scales of sub-pixels in a display module.

Figure 10:
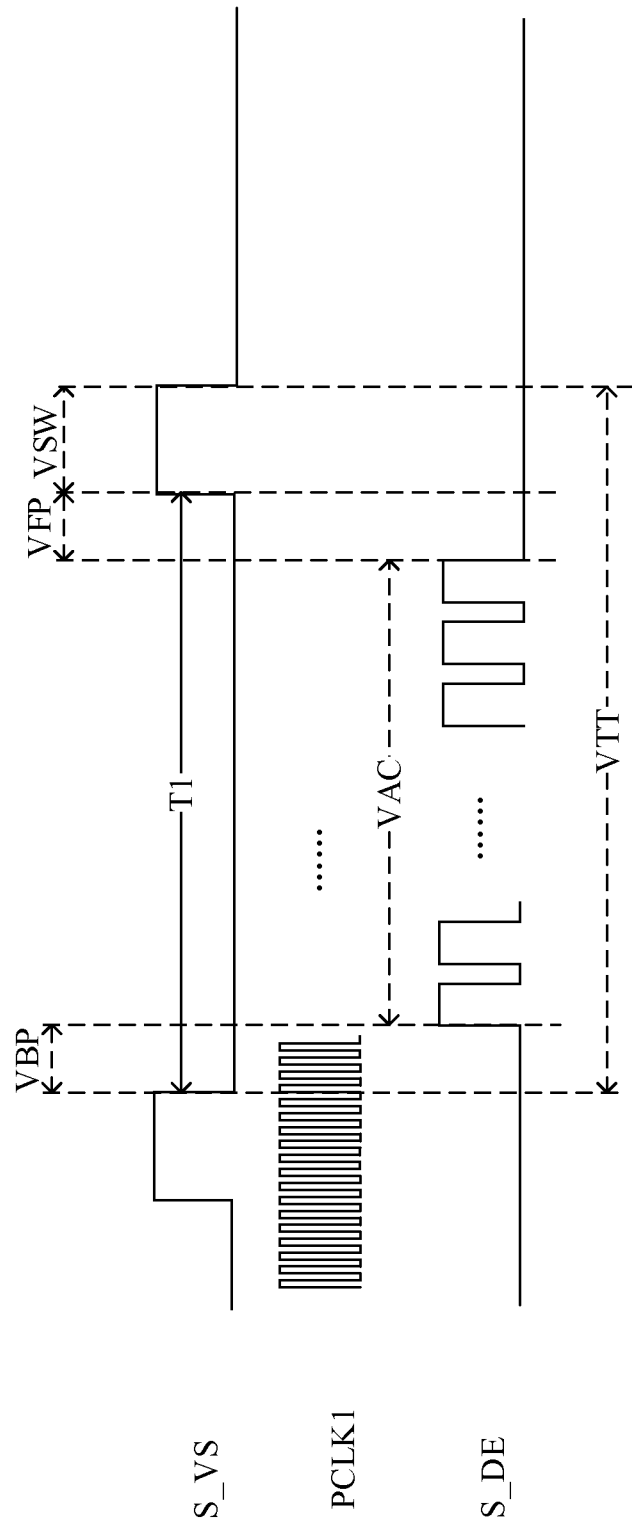
FIG. 10 is yet another signal timing diagram of a signal processing method, in accordance with some embodiments.

The number of pulses of the first pixel clock signal corresponding to the first time period between the trailing edge (i.e., a falling edge) of the first pulse and the leading edge (i.e., a rising edge) of the next first pulse of the first pulse in the first frame synchronization signal is the first integer; and during the first time period between the trailing edge (i.e., the falling edge) of the first pulse and the leading edge (i.e., the rising edge) of the next first pulse of the first pulse in the first frame synchronization signal, the number of clock cycles of the first pixel clock signal is the first integer. For example, the clock cycle may be understood as a period between a leading edge (or a trailing edge) of a pulse and a leading edge (or a trailing edge) of a next pulse of the pulse. For example, the first video signal further includes a first enable signal S_DE (referring to FIG. 10). For example, the first integer is the number of pulses of the first pixel clock corresponding to a sum of VBP, VAC and VFP (VBP+VAC+VFP). VBP represents the number of HTTs between a trailing edge of a pulse (e.g., the first pulse) of a frame synchronization signal (e.g., the first frame synchronization signal S_VS) and a leading edge (e.g., a leading edge of the valid video data) of a pulse (e.g., a first pulse among a plurality of pulses contained in the first enable signal S_DE within a pulse cycle of the first frame synchronization signal S_VS in FIG. 10) of the enable signal; VAC represents the number of HTTs corresponding to all rows of pixels in the display module; and VFP represents the number of HTTs between a trailing edge (e.g., a trailing edge of the valid video data) of the pulse (e.g., a last pulse among the plurality of pulses contained in the first enable signal S_DE within the pulse cycle of the first frame synchronization signal S_VS in FIG. 10) of the enable signal and a leading edge of the pulse (e.g., the first pulse) of the frame synchronization signal (e.g., the first frame synchronization signal S_VS). HTT represents the total number of pixel clock cycles of a row of pixels, that is, HTT represents the number of pulses of a pixel clock signal (e.g., the first pixel clock signal) of a row of pixels. For example, for a case where a resolution of the display module is 1920×1080, HTT is 2200, which may indicate that the number of pulses of the first pixel clock signal of the row of pixels is 2200. For example, the number of pulses of the first pixel clock signal corresponding to an HTT is 2200. VBP is 36, which may indicate that the number of corresponding HTTs is 36. For example, the number of pulses of the first pixel clock signal corresponding to VBP is 36×2200. VFP is 4, which may indicate that the number of corresponding HTTs is 4. For example, the number of pulses of the first pixel clock signal corresponding to VFP is 4×2200. VAC is 1080, which may indicate that the number of corresponding HTTs is 1080. For example, the number of pulses of the first pixel clock signal corresponding to VAC is 1080×2200.

For example, the first pixel clock signal may be obtained according to the first frame synchronization signal, a first horizontal synchronization signal and the first enable signal in the first video signal. The first pixel clock signal is related to a first frame rate of the first video signal. For example, a frequency of the first pixel clock signal is a product of the first frame rate of the first video signal, HTT and VTT, where HTT represents the total number of pixel clock cycles of a row of pixels, and VTT represents the total number of HTTs within a frame (that is, the number of HTTs is VTT within the frame). For example, for the case where the resolution of the display module is 1920×1080, HTT is 2200, and VTT is 1125, in a case where a frame rate of the first video signal is 60 Hz, the frequency of the first pixel clock signal is 148.5 MHz; HTT is 2200, and VTT is 1125, in a case where the frame rate of the first video signal is 59.94 Hz (i.e., 60/1.001 Hz), frequency of the first pixel clock signal is 148.35 MHz. A pulse width of the frame synchronization signal is VSW, and VSW may represent the number of HTTs corresponding to the pulse width of the frame synchronization signal. For example, in the case where the resolution of the display module is 1920×1080, for the first frame synchronization signal, VSW is 5, which indicates that the number of HTTs corresponding to the pulse width of the frame synchronization signal is 5. That is, the number of pulses of the first pixel clock signal corresponding to VSW is 5×2200.

In S20, a synchronization calibration signal is generated. Referring to FIG. 6, the synchronization calibration signal S_eof includes a plurality of second pulses M2. A width of a second pulse is equal to a pulse width of a second pixel clock signal. A triggering edge of the second pulse is delayed compared to a leading edge of a first pulse, and a delay time TD is less than or equal to a sum of a pulse width of the first pixel clock signal and a clock cycle of the second pixel clock signal. For example, a clock cycle of the second pixel clock signal is an interval duration from a leading edge (or trailing edge) of a pulse of the second pixel clock signal to a leading edge (or trailing edge) of a next pulse of the pulse. For example, the triggering edge of the second pulse may be one of a leading edge and a trailing edge of the second pulse. For example, the triggering edge of the second pulse is the leading edge of the second pulse.

A frequency of the second pixel clock signal may be a frequency of a crystal oscillator clock signal. For example, the frequency of the crystal oscillator clock signal is 148.5 MHz. For example, the display apparatus further includes a signal oscillator (OSC), and the signal oscillator is configured to generate a crystal oscillator clock signal, and the crystal oscillator clock signal serves as the second pixel clock signal. For example, the frequency of the second pixel clock signal may be obtained according to a second frame rate of the display module. For example, the frequency of the second pixel clock signal is a product of the second frame rate, HTT and VTT of the display module. For example, the second frame rate of the display module may be in a range from 40 Hz to 70 Hz, inclusive. For example, the second frame rate is 48 Hz, 50 Hz, or 60 Hz.

For example, generating the synchronization calibration signal includes S21 and S22.

Figure 8:
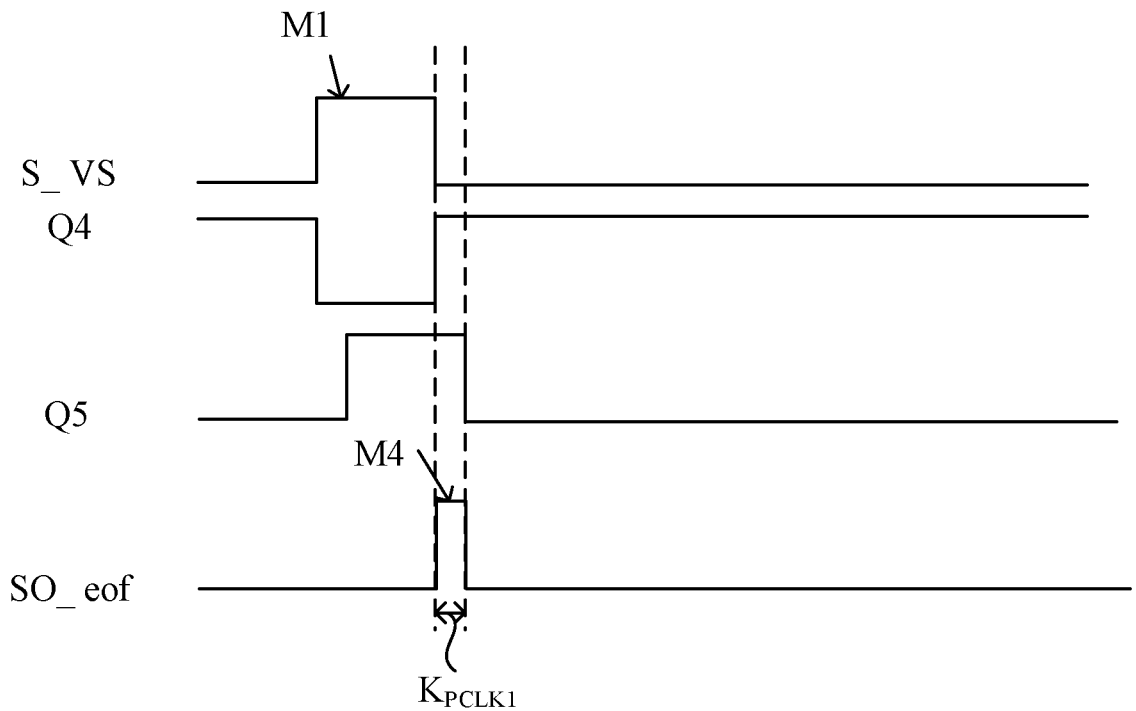
FIG. 8 is yet another signal timing diagram of a signal processing method, in accordance with some embodiments.

In S21, a calibration signal is generated. Referring to FIG. 8, a calibration signal SO_eof includes a plurality of fourth pulses M4. One of a leading edge and a trailing edge of a fourth pulse M4 is at the same time as a trailing edge of a first pulse M1. For example, the leading edge of the fourth pulse is at the same time as the trailing edge of the first pulse M1.

For example, generating the calibration signal includes S211 to S213.

In S211, a fourth signal is generated. Referring to FIG. 8, a fourth signal Q4 and the first frame synchronization signal S_VS are mutually inverted signals. For example, a low-level signal of the fourth signal is within the same time period as a high-level signal of the first frame synchronization signal, and a high-level signal of the fourth signal is within the same time period as a low-level signal of the first frame synchronization signal. Alternatively, a rising edge of a pulse of the fourth signal is at the same time as a falling edge of a pulse of the first frame synchronization signal, and a falling edge of the pulse of the fourth signal is at the same time as a rising edge of the pulse of the first frame synchronization signal.

For example, generating the fourth signal includes inverting the first frame synchronization signal to obtain the fourth signal. For example, the first frame synchronization signal may be inverted by an inverter. For example, the inverter is included in the signal processing device.

In S211, a fifth signal is generated. Referring to FIG. 8, a fifth signal Q5 is delayed by the pulse width of the first pixel clock signal compared to the first frame synchronization signal S_VS, that is, the fifth signal Q5 is delayed by the pulse width $K_{PCLK1}$ of the first pixel clock signal PCLK1 compared to the first frame synchronization signal S_VS.

For example, the first frame synchronization signal may be output after being registered for the pulse width of the first pixel clock signal in a register to obtain the fifth signal. For example, the register is included in the signal processing device.

In S213, referring to FIG. 8, the calibration signal SO_eof is obtained according to the fourth signal Q4 and the fifth signal Q5.

For example, obtaining the calibration signal according to the fourth signal and the fifth signal, includes performing a second logic operation on the fourth signal and the fifth signal to obtain the calibration signal. For example, a signal output after the fourth signal and the fifth signal pass through a second logic circuit is the calibration signal. For example, the second logic circuit is included in the signal processing device. For example, the second logic operation may include an AND operation; and the second logic circuit may include an AND gate. For example, a signal output after the fourth signal and the fifth signal pass through the AND gate is the calibration signal; for example, the AND gate is included in the signal processing device.

Figure 7:
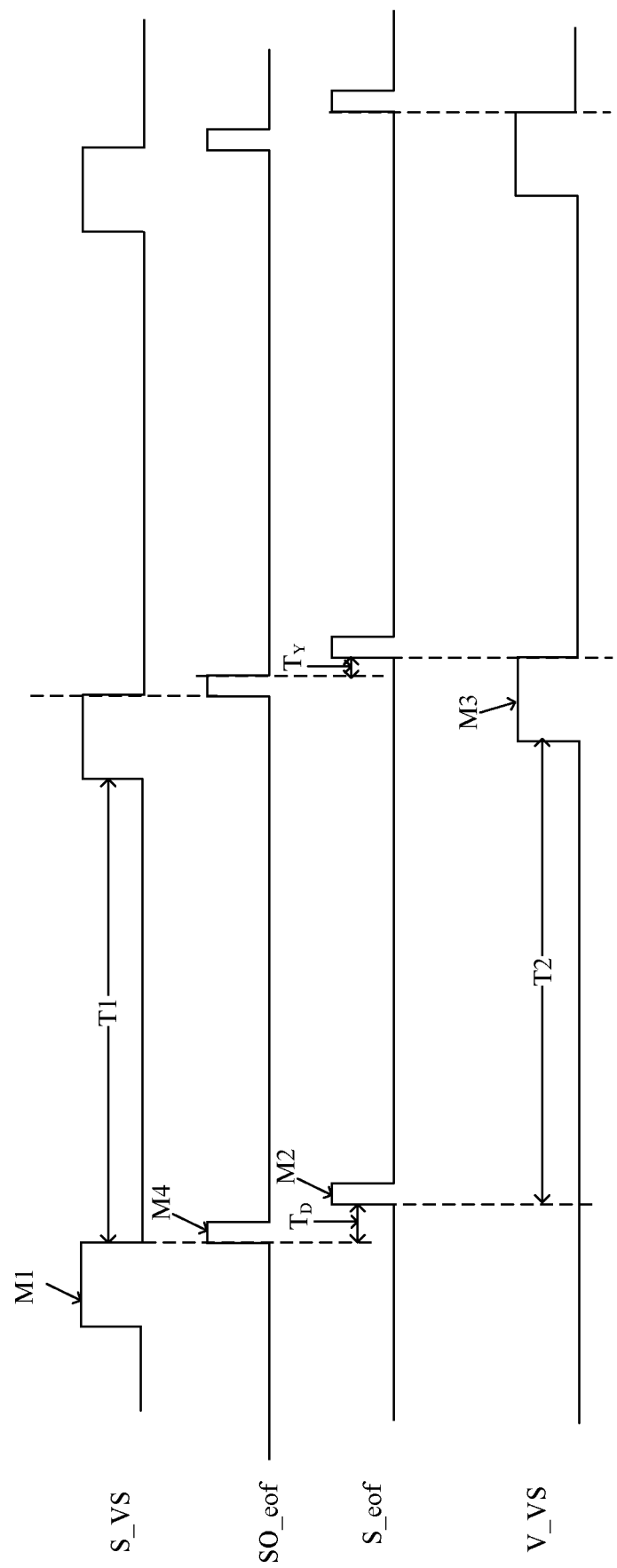
FIG. 7 is another signal timing diagram of a signal processing method, in accordance with some embodiments.

In S22, the synchronization calibration signal is obtained according to the calibration signal. The second pulses of the synchronization calibration signal are delayed compared to the fourth pulses of the calibration signal, and a delay time is less than or equal to the clock cycle of the second pixel clock signal. For example, referring to FIG. 7, a leading edge of the second pulse M2 of the synchronization calibration signal S_eof is delayed compared to a trailing edge of the fourth pulse M4 of the calibration signal SO_eof, and a delay time $T_Y$ is less than or equal to the clock cycle of the second pixel clock signal.

In this case, the calibration signal in an associated clock domain corresponding to the input frames (i.e., a source clock domain, also a clock domain where a signal of the input frames is located) may be converted into the synchronous calibration signal in a local clock domain corresponding to the output frames. For example, a time domain converter in the signal processing device performs a clock domain crossing (CDC) processing on an input signal, so that the associated clock domain where the calibration signal corresponding to the first frame synchronization signal is located is converted to the local clock domain where the synchronization calibration signal is located, thereby ensuring accuracy of signal.

For example, obtaining the synchronization calibration signal according to the calibration signal includes S221 to S224.

Figure 9:
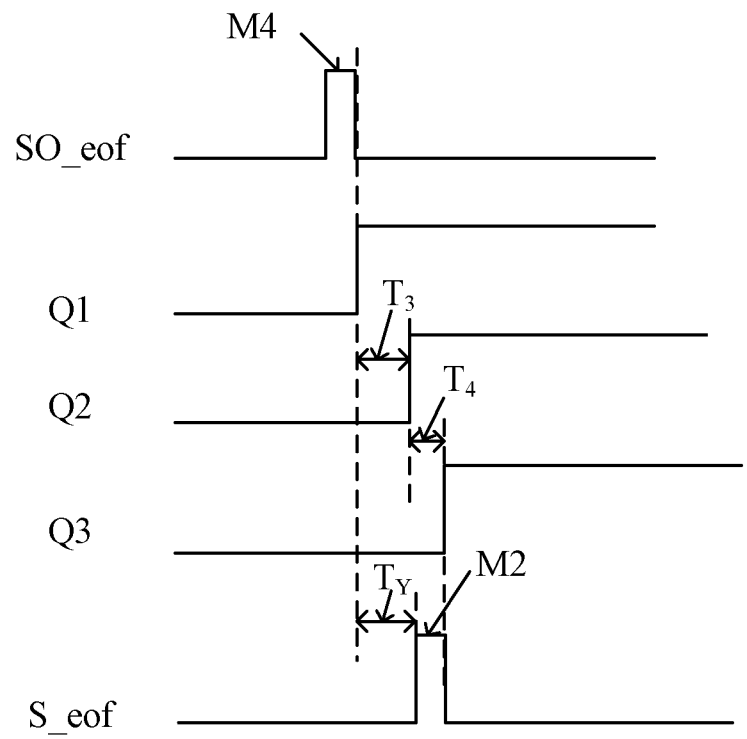
FIG. 9 is yet another signal timing diagram of a signal processing method, in accordance with some embodiments.

In S221, a first signal is generated. Referring to FIG. 9, a leading edge of a pulse of a first signal Q1 is at the same time as the trailing edge of the fourth pulse M4 of the calibration signal.

In S222, a second signal is generated. Referring to FIG. 9, pulses of the second signal Q2 are delayed by a third time period T3 compared with pulses of the first signal, and the third time period T3 is less than or equal to the clock cycle of the second pixel clock signal. For example, the first signal may be registered by a first register for the third time period to obtain the second signal. For example, the first register is included in the signal processing device.

In S223, a third signal is generated. Referring to FIG. 9, pulses of a third signal Q3 are delayed by a fourth time period T4 compared with the pulses of the second signal, and the fourth time period T4 is equal to the pulse width of the second pixel clock signal. For example, the second signal may be registered by a second register for the fourth time period, i.e., for a pulse width of the second pixel clock, to obtain the third signal. For example, the second register is included in the signal processing device. For example, the first register and the second register may be the same register or different registers, which is not limited.

In S224, referring to FIG. 9, the synchronization calibration signal S_eof is obtained according to the second signal Q2 and the third signal Q3. For example, referring to FIG. 9, a trailing edge of the third signal Q3 is at the same time as a trailing edge of the synchronization calibration signal S_eof.

For example, obtaining the synchronization calibration signal according to the second signal and the third signal, includes performing a first logic operation on the second signal and the third signal to obtain the synchronization calibration signal. For example, a signal output after the second signal and the third signal pass through a first logic circuit is the synchronization calibration signal. For example, the first logic circuit is included in the signal processing device. For example, the first logic operation may include an exclusive OR operation; and the first logic circuit may include an exclusive OR gate. For example, a signal output after the second signal and the third signal pass through the exclusive OR gate is the synchronization calibration signal; for example, the exclusive OR gate is included in the signal processing device.

In S30, a second frame synchronization signal is generated. Referring to FIG. 6, a second frame synchronization signal V_VS includes a plurality of third pulses M3. A period between a triggering edge of each second pulse M2 and a leading edge of a third pulse M3 closest to the second pulse M2 and after the second pulse M2 is a second time period T2.

In a case where a ratio of the frequency of the second pixel clock signal to the frequency of the first pixel clock signal is within a threshold range, the second time period corresponds to a second integer number of pulses of the second pixel clock signal, where the second integer is an integer value of a product of the first integer and the ratio.

For example, the threshold range is from 0.9 to 1.1, inclusive. For example, the threshold range is greater than or equal to 0.9 and less than 1, or greater than 1 and less than or equal to 1.1. For example, the threshold range may be a set constituted by discrete values. For example, the threshold range may include 0.99 and 0.999, or 1.001 and 1.011; and thus, the ratio may be 0.99, 0.999, 1.001 or 1.011. For another example, the threshold range may be a set constituted by continuous values. For example, the threshold range may include any value from 0.9 to 0.999, or any value from 1.001 to 1.011; and thus, the ratio may be in a set of 0.9 to 0.999, or the ratio may be in a set of 1.001 to 1.011. For example, the product of the first integer and the ratio is rounded, e.g., rounded up or rounded down, and an integer value obtained after rounding is the second integer. For example, a result of (N1×J) is rounded to N2, where N1 is the first integer, J is the ratio of the frequency of the second pixel clock signal to the frequency of the first pixel clock signal, and N2 is the second integer. For example, if the frequency of the first pixel clock signal is 148.35 MHz and the frequency of the second pixel clock signal is 148.5 MHz, J is 1.001, and in this case, N2 is a product of 1.001 and N1 (N2=1.00×N1).

In this case, the ratio of the frequency of the second pixel clock signal to the frequency of the first pixel clock signal is within the threshold range, the frequency of the first pixel clock signal is not equal to the frequency of the second pixel clock signal, and the number of pulses of the second pixel clock signal corresponding to the period between the triggering edge of each second pulse and the leading edge of the third pulse closest to the second pulse and after the second pulse is the second integer, which is an integer value of the product of the first integer and the ratio. Therefore, in a process in which the signal processing device outputs a second video signal (i.e., the output frames) containing the second frame synchronization signal to the display module, a frame rate of the second video signal may be adjusted, so that the frame rate of the second video signal may be equal to the first frame rate of the first video signal.

In some embodiments, in a case where the ratio of the frequency of the second pixel clock signal to the frequency of the first pixel clock signal is 1, the second time period corresponds to a first integer number of pulses of the second pixel clock signal. For example, a ratio of the frequency of the first pixel clock signal to the frequency of the second pixel clock signal is 1, alternatively, the first frame rate is equal to the second frame rate; and the number of pulses of the second pixel clock signal corresponding to the period between the triggering edge of the second pulse and the leading edge of the third pulse closest to the second pulse and after the second pulse is the first integer, which is equal to the number of pulses of the first pixel clock signal corresponding to the period between the trailing edge of the first pulse and the leading edge of the next first pulse of the first pulse. In this case, since the frequency of the first pixel clock signal is equal to the frequency of the second pixel clock signal, the frame rate corresponding to the second video signal may be equal to the first frame rate of the first video signal in a case where the signal processing device outputs the second video signal (i.e., the output frames) containing the second frame synchronization signal to the display module. In addition, the input frame and the output frame may be synchronized through the synchronization calibration signal, errors between the output frames and the input frames may be eliminated, and error accumulation may be avoided, thereby avoiding frame missing or frame skipping in the output of the signal processing device.

For example, generating the second frame synchronization signal includes S31 to S33.

In S31, a third frame synchronization signal is generated. A period between the triggering edge (e.g., the leading edge) of each second pulse and a leading edge of a pulse, closest to the second pulse and after the second pulse, of a third frame synchronization signal corresponds to the second integer number of pulses of the second pixel clock signal.

For example, generating the third frame synchronization signal, includes the following steps.

The number of pulses of the second pixel clock signal is counted.

The leading edge of the pulse of the third frame synchronization signal is generated in a case where the number of pulses of the second pixel clock signal reaches the second integer.

A trailing edge of the pulse of the third frame synchronization signal is generated, and the method returns to perform an operation of counting the number of pulses of the second pixel clock signal in response to the triggering edge of the second pulse, in a case where the number of pulses of the second pixel clock signal does not reach a third integer. For example, in a process of counting the number of pulses of the second pixel clock signal, it may be determined whether the triggering edge of the second pulse is detected; in the case where the number of pulses of the second pixel clock signal does not reach the third integer, the trailing edge of the pulse of the third frame synchronization signal may be generated according to the triggering edge of the second pulse, i.e., in response to the triggering edge of the second pulse, i.e., in response to determining that the triggering edge of the second pulse is detected, namely, in response to arrival of the triggering edge of the second pulse. When the trailing edge of the pulse of the third frame synchronization signal is generated, the method returns to perform the operation of counting of the number of pulses of the second pixel clock signal, that is, the operation of counting of the number of pulses of the second pixel clock signal is restarted. The "restarted" may be understood as being started from an initial state or from zero.

Alternatively, a trailing edge of the pulse of the third frame synchronization signal is generated, and the method returns to perform an operation of counting the number of pulses of the second pixel clock signal in response to a case where the number of pulses of the second pixel clock signal reaches a third integer; and the method returns the operation of counting the number of pulses of the second pixel clock signal in response to the triggering edge of the second pulse. For example, in a process of counting the number of pulses of the second pixel clock signal, in a case where the number of pulses of the second pixel clock signal reaches the third integer, if the triggering edge of the second pulse is not detected, the trailing edge of the pulse of the third frame synchronization signal is generated, and the operation of counting of the number of pulses of the second pixel clock signal is simultaneously restarted; and in a process of restarting counting the number of pulses of the second pixel clock signal after generating the trailing edge of the pulse of the third frame synchronization signal, if the triggering edge of the second pulse is detected, the operation of counting of the number of pulses of the second pixel clock signal is restarted in response to the triggering edge of the second pulse.

For example, the number of pulses of the second pixel clock signal may be counted by a first row counter r_PA and a first column counter r_LA. At a start moment of counting the number of pulses of the second pixel clock signal, values of the first row counter r_PA and the first column counter r_LA are both in an initialized state. For example, the values of the first row counter r_PA and the first column counter r_LA are set to zero or one. In addition, the method returns to perform the operation of counting of the number of pulses of the second pixel clock signal, that is, the method returns to the start moment of counting the number of pulses of the second pixel clock signal, and the first row counter r_PA and the first column counter r_LA are restored to the initialized state. For example, the values of the first row counter r_PA and the first column counter r_LA are set to zero or one, and the number of pulses of the second pixel clock signal is recounted. For example, at a moment of a triggering edge of a second pulse of the synchronization calibration signal, the values of the first row counter r_PA and the first column counter r_LA are both reset to the initialized state. For example, at the moment of the triggering edge of the second pulse of the synchronization calibration signal, the values of the first row counter r_PA and the first column counter r_LA are both zero. For example, at a moment when the number of pulses of the second pixel clock signal reaches the third integer, the values of the first row counter r_PA and the first column counter r_LA are both reset to the initialized state. For example, the values of the first row counter r_PA and the first column counter r_LA are both zero. For example, at a moment of generating the trailing edge of the pulse of the third frame synchronization signal, the values of the first row counter r_PA and the first column counter r_LA are both reset to the initialized state.

For example, the number of pulses of the second pixel clock signal may be counted from a moment when the values of the first row counter r_PA and the first column counter r_LA are both in the initialized state. Each time a pulse of the second pixel clock signal passes, a value of the first row counter r_PA is increased by 1. Each time the value of the first row counter r_PA reaches a first parameter, for example, the first parameter is HTT', the value of the first row counter r_PA is reset to an initialized value, and a value of the first column counter r_LA is increased by 1. The value of the first row counter r_PA is recounted from the initialized value from a moment when the value of the first row counter r_PA reaches the HTT'. For example, for the display module with the resolution of 1920×1080, the first frame rate of the first video signal is 59.94 Hz, the second frame rate of the display module is 60 Hz, the ratio of the second frame rate to the first frame rate is 1.001, and HTT' is equal to a product of HTT and 1.001 (HTT'=HTT×1.001=2200×1.001 2202). For example, HTT' is 2202, that is, the first parameter is 2202.

Figure 11A:
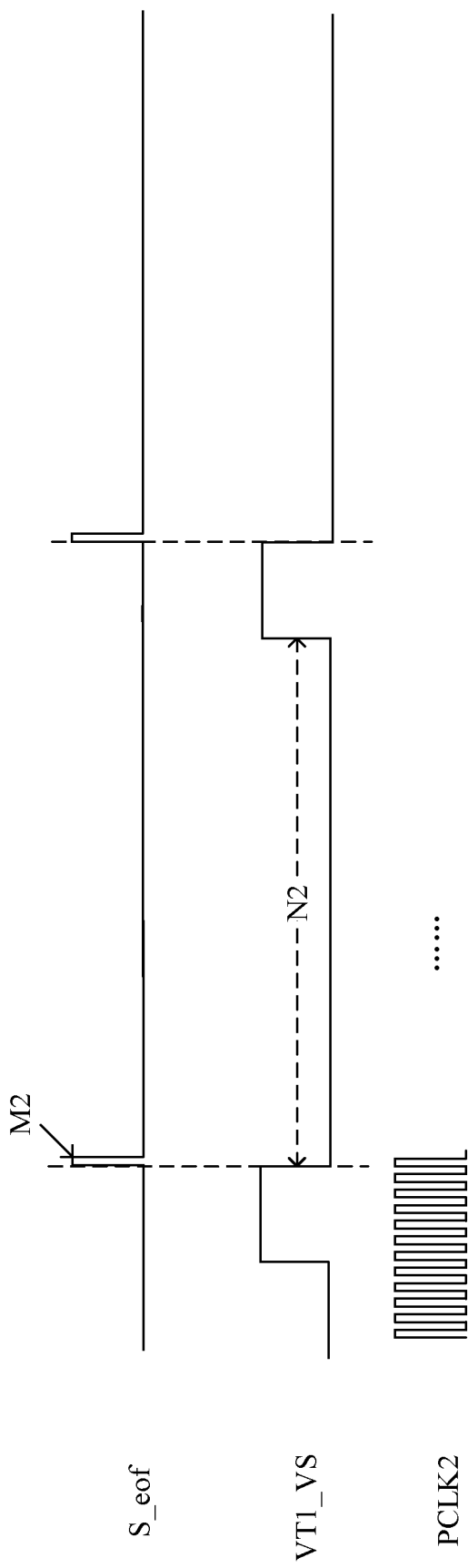
FIG. 11A is yet another signal timing diagram of a signal processing method, in accordance with some embodiments.

In a case where the value of the first column counter r_LA reaches a second parameter, for example, the second parameter is a sum of VBP, VAC and VFP, that is, the second parameter is (VBP+VAC+VFP), referring to FIG. 11A, the number of pulses of the second pixel clock signal PCLK2 reaches the second integer N2, and the leading edge of the pulse of the third frame synchronization signal VT1_VS is generated. For example, the second integer is a product of the first parameter and the second parameter. For example, the second integer N2 is a product of the HTT' and the sum of VBP, VAC and VFP (HTT'×(VBP+VAC+VFP)).

Figure 11B:
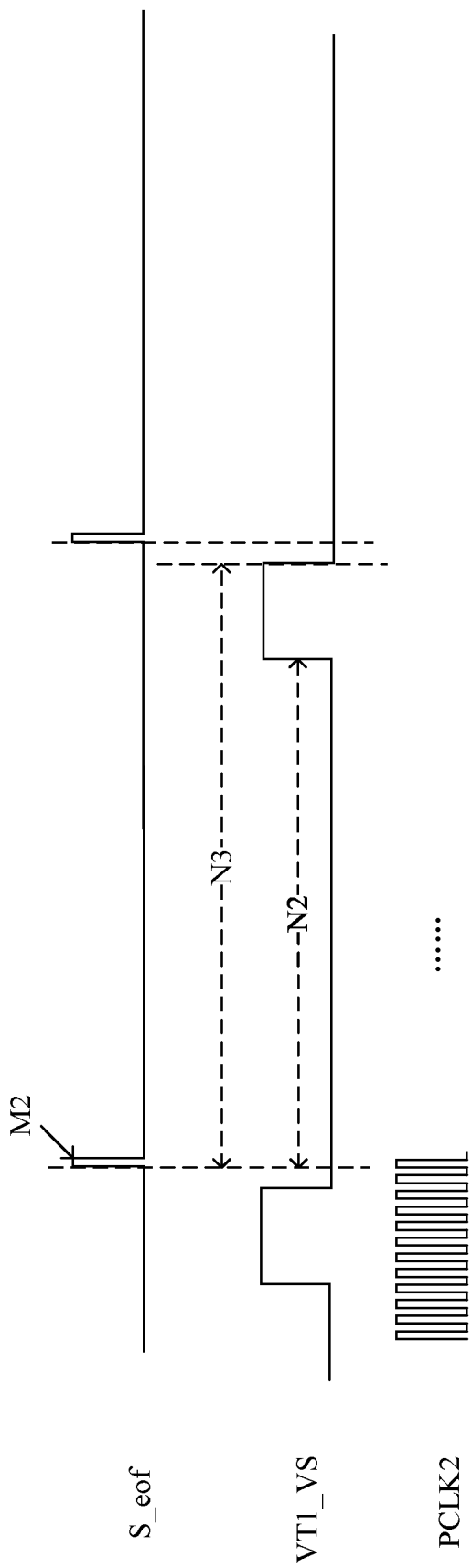
FIG. 11B is yet another signal timing diagram of a signal processing method, in accordance with some embodiments.

In a case where the value of the first column counter r_LA reaches a third parameter, for example, the third parameter is a sum of VBP, VAC, VFP and VSW, that is, the third parameter is (VBP+VAC+VFP+VSW), referring to FIG. 11B, the number of pulses of the second pixel clock signal PCLK2 reaches the third integer N3, and the trailing edge of the pulse of the third frame synchronization signal VT1_VS is generated. For example, the third integer is a product of the first parameter and the third parameter. For example, the third integer N3 is a product of the HTT' and the sum of VBP, VAC, VFP and VSW (HTT'×(VBP+VAC+VFP+VSW)).

In a case where the value of the first column counter r_LA does not reach the third parameter, the number of pulses of the second pixel clock signal does not reach the third integer. Referring to FIG. 11A, at the moment of the triggering edge of the second pulse M2, the trailing edge of the pulse of the third frame synchronization signal VT1_VS is generated. In addition, the values of the first row counter r_PA and the first column counter r_LA are both reset to the initialized state, and the number of pulses of the second pixel clock signal is recounted from the moment of the triggering edge of the second pulse.

It will be noted that two counters are used to count the number of pulses of the second pixel clock signal in the above, but the number of counters is not limited thereto, and may be designed according to actual conditions. For example, one counter may be used to count the number of pulses of the second pixel clock signal, so as to generate the third frame synchronization signal.

It will be understood that, in response to the case where the number of pulses of the second pixel clock signal reaches the third integer, the method returns to perform the operation of counting of the number of pulses of the second pixel clock signal simultaneously when the trailing edge of the pulse of the third frame synchronization signal is generated.

For example, in a case where the value of the first column counter r_LA reaches the third parameter, the number of pulses of the second pixel clock signal reaches the third integer, and the trailing edge of the pulse of the third frame synchronization signal is generated. Simultaneously, the values of the first row counter r_PA and the first column counter r_LA are both reset to the initialized state, and the number of pulses of the second pixel clock signal is recounted from the moment when the number of pulses of the second pixel clock signal reaches the third integer.

Compared to the moment when the number of pulses of the second pixel clock signal reaches the third integer, the values of the first row counter r_PA and the first column counter r_LA are preferentially initialized at the moment of the triggering edge of the second pulse.

For example, that the number of pulses of the second pixel clock signal reaches the third integer means that the number of pulses of the second pixel clock signal reaches the third integer within a single statistical cycle. The statistical cycle may be a time period from a moment at which the triggering edge of the second pulse of the synchronization calibration signal is located to a moment when the number of pulses of the second pixel clock signal reaches the number of pulses of the second pixel clock signal corresponding to VTT (for example, the number of pulses of the second pixel clock signal corresponding to VTT is a product of HTT' and VTT (HTT'×VTT)).

It will be understood that, for a third pulse of the second frame synchronization signal during a time period of at least one set of two adjacent second pulses in the synchronization calibration signal, in a process of generating the third pulse, the number of pulses of the second pixel clock signal is counted from a moment of a leading edge of a former one of two adjacent second pulses, and if the number of pulses of the second pixel clock signal does not reach the third integer at a moment of arrival of a triggering edge of a latter second pulse in the synchronization calibration signal, in a time period from the trailing edge of the third pulse to a leading edge of a second pulse closest to the third pulse and after the third pulse, the second frame synchronization signal is at a low level, that is, the second frame synchronization signal is in a blanking phase.

In S32, the fourth frame synchronization signal is generated. A period between the triggering edge of each second pulse and a leading edge of a pulse, closest to the second pulse and after the second pulse, of a fourth frame synchronization signal corresponds to the first integer number of pulses of the second pixel clock signal.

For example, generating the fourth frame synchronization signal, includes the following steps.

The number of pulses of the second pixel clock signal is counted.

The leading edge of the pulse of the fourth frame synchronization signal is generated in a case where the number of pulses of the second pixel clock signal reaches the first integer.

A trailing edge of the pulse of the fourth frame synchronization signal is generated, and the method returns to perform an operation of counting the number of pulses of the second pixel clock signal in response to the triggering edge of the second pulse, in a case where the number of pulses of the second pixel clock signal does not reach a fourth integer. For example, in a process of counting the number of pulses of the second pixel clock signal, it may be determined whether the triggering edge of the second pulse is detected; in the case where the number of pulses of the second pixel clock signal does not reach the fourth integer, the trailing edge of the pulse of the fourth frame synchronization signal may be generated according to the triggering edge of the second pulse, i.e., in response to the triggering edge of the second pulse, i.e., in response to determining that the triggering edge of the second pulse is detected, namely, in response to arrival of the triggering edge of the second pulse. When the trailing edge of the pulse of the fourth frame synchronization signal is generated, the method returns to perform the operation of counting of the number of pulses of the second pixel clock signal, that is, the operation of counting of the number of pulses of the second pixel clock signal is restarted.

Alternatively, a trailing edge of the pulse of the second frame synchronization signal is generated, and the method returns to perform an operation of counting the number of pulses of the second pixel clock signal in response to a case where the number of pulses of the second pixel clock signal reaches a fourth integer; and the method returns the operation of counting of the number of pulses of the second pixel clock signal in response to the triggering edge of the second pulse. For example, in a process of counting the number of pulses of the second pixel clock signal, in the case where the number of pulses of the second pixel clock signal reaches the fourth integer, if the triggering edge of the second pulse is not detected, the trailing edge of the pulse of the fourth frame synchronization signal is generated, and the operation of counting of the number of pulses of the second pixel clock signal is simultaneously restarted; and in the process of restarting counting the number of pulses of the second pixel clock signal after generating the trailing edge of the pulse of the fourth frame synchronization signal, if the triggering edge of the second pulse is detected, the operation of counting of the number of pulses of the second pixel clock signal is restarted in response to the triggering edge of the second pulse.

For example, the number of pulses of the second pixel clock signal may be counted by a second row counter r_PB and a second column counter r_LB. At a start moment of counting the number of pulses of the second pixel clock signal, values of the second row counter r_PB and the second column counter r_LB are both in an initialized state. For example, the values of the second row counter r_PB and the second column counter r_LB are set to zero or one. In addition, the method returns to perform the operation of counting of the number of pulses of the second pixel clock signal, that is, the method returns to the start moment of counting the number of pulses of the second pixel clock signal, and the second row counter r_PB and the second column counter r_LB are restored to the initialized state. For example, the values of the second row counter r_PB and the second column counter r_LB are set to zero or one, and the number of pulses of the second pixel clock signal is recounted. For example, at the moment of the triggering edge of the second pulse of the synchronization calibration signal, the values of the second row counter r_PB and the second column counter r_LB are both reset to the initialized state. For example, at the time of the triggering edge of the second pulse of the synchronization calibration signal, the values of the second row counter r_PB and the second column counter r_LB are both zero. For example, at a moment when the number of pulses of the second pixel clock signal reaches the fourth integer, the values of the second row counter r_PB and the second column counter r_LB are both reset to the initialized state. For example, the values of the second row counter r_PB and the second column counter r_LB are both zero. For example, at the moment of generating the trailing edge of the pulse of the fourth frame synchronization signal, the values of the second row counter r_PB and the second column counter r_LB are both reset to the initialized state.

For example, the number of pulses of the second pixel clock signal may be counted from a moment when the values of the second row counter r_PB and the second column counter r_LB are both in the initialized state. Each time a pulse of the second pixel clock signal passes, a value of the second row counter r_PB is increased by 1. Each time the value of the second row counter r_PB reaches a fourth parameter, for example, the fourth parameter is HTT, the value of the second row counter r_PB is reset to an initialized value, and a value of the column counter r_LB is increased by 1. The value of the row counter r_PB is recounted from the initialized value from a moment when the value of the row counter r_PB reaches the HTT. For example, for the display module with the resolution of 1920×1080, if the first frame rate of the first video signal is 60 Hz and the second frame rate of the display module is 60 Hz, the HTT is 2200, that is, the fourth parameter is 2200.

The first parameter is an integer value of a product of the second parameter and a scale factor, and the scale factor is the ratio of the second frame rate to the first frame rate, i.e., the ratio of the frequency of the second pixel clock signal to the frequency of the first pixel clock signal.

In a case where the value of the second column counter r_LB reaches the second parameter, for example, the second parameter is a sum of VBP, VAC and VFP (VBP+VAC+VFP), referring to FIG. 12A, the number of pulses of the second pixel clock signal PCLK2 reaches the first integer N1, and the leading edge of the pulse of the fourth frame synchronization signal VT2_VS is generated. For example, the first integer is a product of the fourth parameter and the second parameter. For example, the first integer N1 is a product of HTT and the sum of VBP, VAC and VFP (HTT×(VBP+VAC+VFP)).

It will be understood that the second integer N2 is an integer value of a product of the first integer N1 and the ratio J, that is, N2 is equal to a product of HTT, J and the sum of VBP, VAC and VFP (N2=HTT×(VBP+VAC+VFP)×J), and N2 is equal to a product of HTT' and the sum of VBP, VAC and VFP (N2=HTT'×(VBP+VAC+VFP)), and therefore, HTT' is equal to a product of HTT and J (HTT'=HTT×J). For example, if J is equal to 1.001 (J=1.001) and HTT is equal to 2200 (HTT=2200), HTT' is equal to a product of 2200 and 1.001 (HTT'=2200×1.001 2202), where the integer value of the product of the first integer N1 and the ratio J is obtained by rounding down.

Figure 12B:
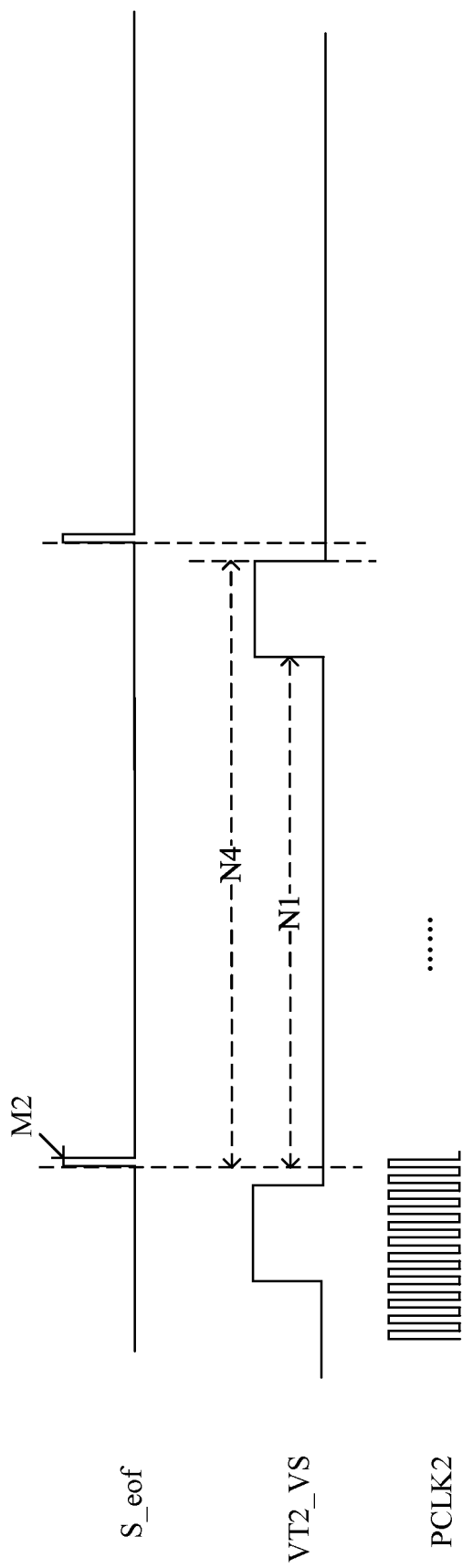
FIG. 12B is yet another signal timing diagram of a signal processing method, in accordance with some embodiments.

In a case where the value of the second column counter r_LB reaches the third parameter, for example, the third parameter is a sum of VBP, VAC, VFP and VSW (VBP+VAC+VFP+VSW), referring to FIG. 12B, the number of pulses of the second pixel clock signal PCLK2 reaches the fourth integer N4, and the trailing edge of the pulse of the fourth frame synchronization signal VT2_VS is generated. For example, the fourth integer is a product of the fourth parameter and the third parameter. For example, the fourth integer N4 is a product of HTT and the sum of VBP, VAC, VFP and VSW (HTT×(VBP+VAC+VFP+VSW)).

In a case where the value of the second column counter r_LB does not reach the third parameter, the number of pulses of the second pixel clock signal does not reach the fourth integer. Referring to FIG. 12A, at the moment of the triggering edge of the second pulse M2, the trailing edge of the pulse of the fourth frame synchronization signal VT2_VS is generated. In addition, the values of the second row counter r_PB and the second column counter r_LB are both reset to the initialized state, and the number of pulses of the second pixel clock signal is recounted from the triggering edge of the second pulse.

It will be noted that two counters are used to count the number of pulses of the second pixel clock signal, but the number of counters is not limited thereto, and may be designed according to actual conditions. For example, one counter may be used to count the number of pulses of the second pixel clock signal, so as to generate the fourth frame synchronization signal.

It will be understood that, in response to the case where the number of pulses of the second pixel clock signal reaches the fourth integer, the method returns to perform the operation of counting of the number of pulses of the second pixel clock signal simultaneously when the trailing edge of the pulse of the fourth frame synchronization signal is generated.

For example, in the case where the value of the second column counter r_LB reaches the third parameter, the number of pulses of the second pixel clock signal reaches the fourth integer, and the trailing edge of the pulse of the fourth frame synchronization signal is generated. Simultaneously, the values of the second row counter r_PB and the second column counter r_LB are both reset to the initialized state, and the number of pulses of the second pixel clock signal is recounted from the moment when the number of pulses of the second pixel clock signal reaches the fourth integer.

Compared to the moment when the number of pulses of the second pixel clock signal reaches the fourth integer, the values of the second row counter r_PB and the second column counter r_LB are preferentially initialized at the moment of the triggering edge of the second pulse.

For example, that the number of pulses of the second pixel clock signal reaches the fourth integer means that the number of pulses of the second pixel clock signal reaches the fourth integer within a single statistical cycle. The statistical cycle may be the time period from a moment at which the triggering edge of the second pulse of the synchronization calibration signal is located to a moment when the number of pulses of the second pixel clock signal reaches the number of pulses of the second pixel clock signal corresponding to VTT (for example, the number of pulses of the second pixel clock signal corresponding to VTT is a product of HTT and VTT (HTT×VTT)).

It will be understood that, for a third pulse of the second frame synchronization signal during a time period of at least one set of two adjacent second pulses in the synchronization calibration signal, in a process of generating the third pulse, the number of pulses of the second pixel clock signal is counted from a moment of a leading edge of a former one of two adjacent second pulses, and if the number of pulses of the second pixel clock signal does not reach the fourth integer at a moment of arrival of a triggering edge of a latter second pulse of the synchronization calibration signal, in a time period from the trailing edge of the third pulse to a leading edge of a second pulse closest to the third pulse and after the third pulse, the second frame synchronization signal is at a low level, that is, the second frame synchronization signal is in a blanking phase.

For example, the signal processing device is configured with a first timing parameter and a second timing parameter. The first timing parameter includes HTT, HFP, HBP, HSW, HAC, VTT, VFP, VBP, VSW and VAC; and the second timing parameter includes HTT', HFP', HBP', HSW', HAC', VTT, VFP, VBP, VSW and VAC. A ratio of a value of HTT to a value of HTT', a ratio of a value of HFP to a value of HFP', a ratio of a value of HBP to a value of HBP', and a ratio of a value of HSW to a value of HSW' are all approximately equal to a ratio of the frequency of the first pixel clock signal to the frequency of the second pixel clock signal, and are also approximately equal to a ratio of the first frame rate of the first video signal to the frame rate of the second video signal. For example, for the case where the resolution of the display module is 1920×1080, in the first timing parameter, HTT is 2200, HFP is 88, HBP is 148, HSW is 44, HAC is 1920, VTT is 1125, VFP is 4, VBP is 36, VSW is 5 and VAC is 1080; in the second timing parameter, HTT' is 2202, HFP' is 89, HBP' is 149, HSW' is 44, HAC is 1920, VTT is 1125, VFP is 4, VBP is 36, VSW is 5 and VAC is 1080. The first timing parameter may be a standard timing parameter. In this way, in response to the synchronization calibration signal, the signal processing device may generate the fourth frame synchronization signal according to the first timing parameter, and may generate the third frame synchronization signal according to the second timing parameter. HTT and HTT' have the same meaning, for example, both of them represent the total number of pixel clock cycles of a row of pixels, that is, both of them represent the number of pulses of the second pixel clock signal of a row of pixels, but specific values of HTT and HTT' are different.

For example, the signal processing device may include two timing signal generators, and the two timing signal generators include a first timing signal generator and a second timing signal generator. The first timing signal generator is configured to generate the fourth frame synchronization signal, and the second timing signal generator is configured to generate the third frame synchronization signal. The first timing signal generator is configured with the first timing parameter, and the second timing signal generator is configured with the second timing parameter. In this way, in response to the synchronization calibration signal, the second timing signal generator may generate the third frame synchronization signal according to the second timing parameter, and the first timing signal generator may generate the fourth frame synchronization signal according to the first timing parameter.

In S33, in a case where a first condition is met, the third frame synchronization signal is selected as the second frame synchronization signal, and in a case where a second condition is met, the fourth frame synchronization signal is selected as the second frame synchronization signal. The first condition is that the ratio of the frequency of the second pixel clock signal to the frequency of the first pixel clock signal is within the threshold range, or the ratio of the second frame rate of the display module to the first frame rate of the first video signal is within the threshold range. The second condition is that the frequency of the first pixel clock signal is equal to the frequency of the second pixel clock signal, or the first frame rate of the first video signal is equal to the second frame rate of the display module.

For example, the signal processing device further includes a multiplexer (MUX). The multiplexer is configured to gate the third frame synchronization signal in the case where the first condition is met, and to gate the fourth frame synchronization signal in the case where the second condition is met. A video signal output from the multiplexer may serve as the second frame synchronization signal.

In some embodiments, the signal processing method further includes: detecting the first frame rate of the obtained first video signal, and obtaining the second frame rate of the display module. For example, the signal processing device further includes a frame rate detector, and the frame rate detector is capable of detecting the first frame rate of the obtained first video signal. For example, the frame rate detector may be a processor. For example, in a case where the first video signal is transmitted to the signal processing device through an SDI, the frame rate detector may detect payload information in the first video signal and analyze an identification (ID) of the payload information to obtain the first frame rate of the first video signal. For example, by analyzing a value corresponding to bit numbers b0 to b3 and a byte 2 in the payload information, the first frame rate may be obtained. For example, in a case where the value is $A_h$, the first frame rate is 60/1.001 Hz, i.e., 59.94 Hz; and in a case where the value is $B_h$, the first frame rate is 60 Hz. For example, the first frame rate may be 60 Hz or 59.94 Hz. For example, the second frame rate may be 60 Hz.

For example, the frequency of the first pixel clock signal is 148.35 MHz, and the frequency of the second pixel clock signal is 148.5 MHz, the ratio of the frequency of the second pixel clock signal to the frequency of the first pixel clock signal is 1.001, the first integer is the product of HTT and the sum of VBP, VAC and VFP (HTT×(VBP+VAC+VFP)), the second integer is the product of HTT' and the sum of VBP, VAC and VFP (HTT'×(VBP+VAC+VFP)), and the second integer is the integer value of the product of the first integer and the ratio. For example, if HTT is 2200, HTT' is an integer value of a product of 2200 and 1.001 (e.g., rounding down the product of 2200 and 1.001), i.e., 2202. In this way, in a case where the first frame rate of the first video signal is 60/1.001 Hz, the frequency of the first pixel clock signal is 148.35 MHz, and the third frame synchronization signal serves as the second frame synchronization signal, and then the frame rate of the second video signal output by the signal processing device is 60/1.001 Hz; and in a case where the first frame rate of the first video signal is 60 Hz, the frequency of the first pixel clock signal is 148.5 MHz, and the fourth frame synchronization signal serves as the second frame synchronization signal, and then the frame rate of the second video signal output by the signal processing device is 60 Hz. As a result, it may make a frame rate of the input frames matched with a frame rate of the output frames.

That is to say, if the ratio of the frequency of the second pixel clock signal to the frequency of the first pixel clock signal is within the threshold range, that is, the ratio of the second frame rate of the display module to the first frame rate of the first video signal is within the threshold range, for example, the second frame rate of the display module is 60 Hz, the first frame rate of the first video signal is 60/1.001 Hz, the frequency of the second pixel clock signal is 148.5 MHz and the frequency of the first pixel clock signal is 148.35 MHz, in this case, the third frame synchronization signal is selected as the second frame synchronization signal, and then the frame rate corresponding to the second video signal is a ratio of the frequency of the second pixel clock signal to the product of HTT' and VTT. For example, in a case where the frequency of the second pixel clock signal is 148.5 MHz, HTT' is 2202 and VTT is 1125, the frame rate of the second video signal is a quotient of 148.5 MHz and a product of 2202 and 1125 ((148.5 MHz/(2202×1125)) 59.94 Hz), that is, the frame rate of the second video signal is equal to the first frame rate of the first video signal. If the frequency of the second pixel clock signal is equal to the frequency of the first pixel clock signal, that is, the second frame rate of the display module is equal to the first frame rate of the first video signal, for example, the second frame rate of the display module is 60 Hz, the first frame rate of the first video signal is 60 Hz, the frequency of the second pixel clock signal is 148.5 MHz, and the frequency of the first pixel clock signal is 148.5 MHz, in this case, the fourth frame synchronization signal is selected as the second frame synchronization signal, and then the frame rate corresponding to the second video signal is a ratio of the frequency of the second pixel clock signal to the product of HTT and VTT. For example, in a case where the frequency of the second pixel clock signal is 148.5 MHz, the HTT is 2200 and the VTT is 1125, the frame rate corresponding to the second video signal is a quotient of 148.5 MHz and a product of 2200 and 1125 ((148.5 MHz/(2200×1125))=60 Hz). In this way, the signal processing device dynamically adjusts the frame rate of the output frames according to the frame rate of the input frames, so that the frame rate of the second video signal is equal to the first frame rate of the first video signal, and the frame rate of the input frames is matched with the frame rate of the output frames.

In this case, the frame rate of the second video signal output by the signal processing device may be dynamically adjusted according to the first frame rate of the first video signal, so that the frame rate of the input frames is matched with the frame rate of the output frames. In this way, a problem of signal delay or loss due to mismatch of the input frame and the output frame may be avoided, thereby improving the authenticity of the display. In addition, the signal processing device may dynamically adjust a frame rate of the output video signal, which may avoid a problem that connection of a transmission interface is interrupted (for example, a high-definition digital display interface (V-by-One (VBO)) is out of lock) and data cannot be transmitted due to a fact that a local pixel clock signal (i.e., a pixel clock signal corresponding to the display module, namely, the second pixel clock signal in the present disclosure) serve as a reference clock signal of the transmission interface (e.g., the VBO) in a process in which the signal processing device outputs the video signal and the transmission interface transmits the second video signal according to the reference clock signal and dynamically corrects the reference clock signal during the transmission of the video signal.

Therefore, embodiments of the present disclosure provide the signal processing method, in which the period between the trailing edge of the first pulse and the leading edge of the next first pulse of the first pulse in the obtained first frame synchronization signal is the first time period, and the first time period corresponds to the first integer number of pulses of the first pixel clock signal; the triggering edge of each second pulse in the generated synchronization calibration signal is delayed compared to the trailing edge of the first pulse, and the delay time is less than or equal to the sum of the pulse width of the first pixel clock signal and the clock cycle of the second pixel clock signal; in the generated second frame synchronization signal, the period between the triggering edge of each second pulse and the leading edge of the third pulse closest to the second pulse and after the second pulse is the second time period; and in the case where the ratio of the frequency of the second pixel clock signal to the frequency of the first pixel clock signal is within the threshold range, the second time period corresponds to the second integer number of pulses of the second pixel clock signal, and the second integer is the integer value of the product of the first integer and the ratio. In this case, the output video signal (i.e., the second video signal) may be adjusted according to the input video signal (i.e., the first video signal), so that the frame rate of the output video signal is matched with the frame rate of the input video signal, and the period between the triggering edge of each second pulse and the leading edge of the third pulse closest to the second pulse and after the second pulse remains unchanged through the synchronization calibration signal. In this way, a single frame of video signal may be output during a time period when a single frame of video signal is input, so as to avoid the error between the input frame and the output frame. In this case, it is possible to avoid a situation where a time delay of the input frame video signal and the output frame video signal of the signal processing device and a length of the time delay is continuously accumulated with the increase of the number of frames to result in frame skipping or a difference of at least one frame between the output frame and the input frame; and it is also possible to avoid a problem that output frames are not uniform. In this way, the accuracy of displayed images may be improved, and the authenticity of displayed images may also be improved.

In some embodiments, the signal processing method further includes: writing video data into a storage device, and reading the video data in the storage device to obtain the second video signal according to the second frame synchronization signal. The second video signal includes the second frame synchronization signal and the video data.

It will be understood that a second enable signal may be obtained according to the second frame synchronization signal, and the video data is read from the storage device to obtain the second video signal according to the second enable signal. For example, in the case where the frequency of the first pixel clock signal is equal to the frequency of the second pixel clock signal, or the first frame rate of the first video signal is equal to the second frame rate of the display module, the fourth frame synchronization signal serves as the second frame synchronization signal, and the second enable signal is obtained according to the second frame synchronization signal. For another example, in the case where the ratio of the frequency of the second pixel clock signal to the frequency of the first pixel clock signal is within the threshold range, or the ratio of the second frame rate of the display module to the first frame rate of the first video signal is within the threshold range, the third frame synchronization signal serves as the second frame synchronization signal, and the second enable signal is obtained according to the second frame synchronization signal. During a time period when the signal processing device receives a single frame of video signal (i.e., the first video signal), the signal processing device may output a single frame of video signal (i.e., the second video signal).

Figure 13A:
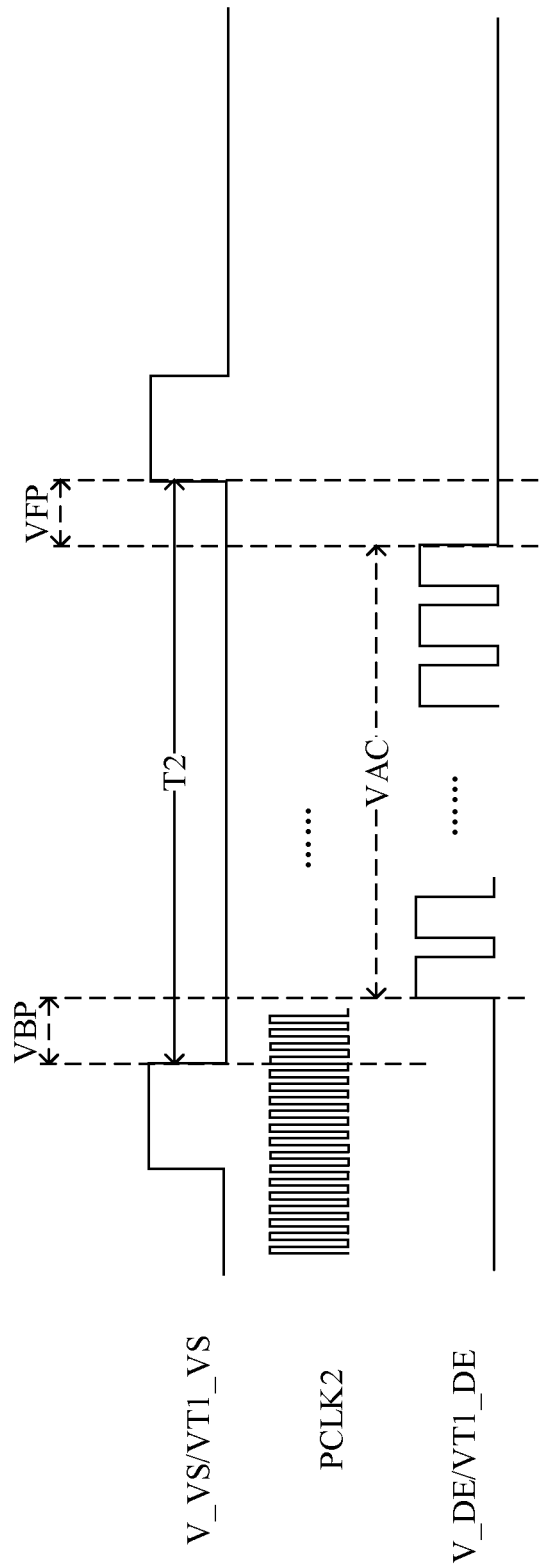
FIG. 13A is yet another signal timing diagram of a signal processing method, in accordance with some embodiments.
Figure 13B:
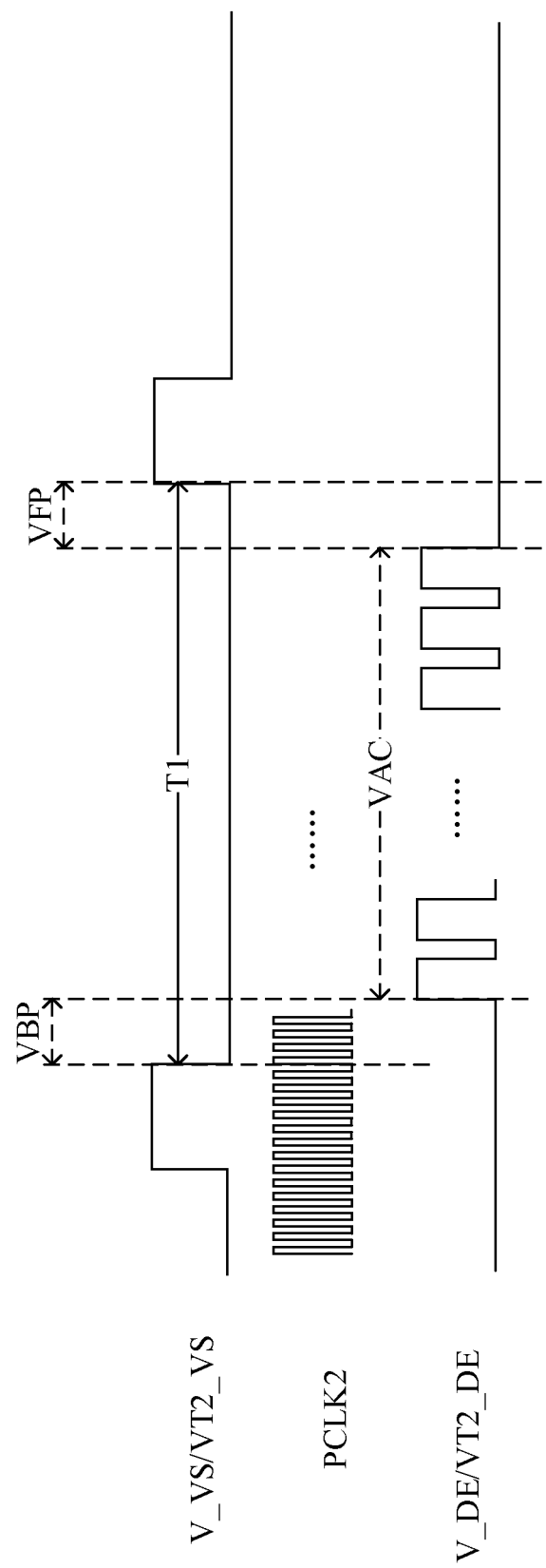
FIG. 13B is yet another signal timing diagram of a signal processing method, in accordance with some embodiments.

For example, referring to FIGS. 13A and 13B, in a pulse cycle of the second frame synchronization signal V_VS, the second enable signal V_DE includes a plurality of pulses. For example, a duration from a rising edge of a first pulse to a falling edge of a last pulse in the plurality of pulses is a duration corresponding to VAC. For example, a pulse cycle of the plurality of pulses in the second enable signal is a duration corresponding to HTT.

For example, for a case where the third frame synchronization signal serves as the second frame synchronization signal, within a single statistical cycle, i.e., within a pulse cycle of the second frame synchronization signal (i.e., the third frame synchronization signal), in a case where the value of the first column counter r_LA is greater than a sum of VSW and VBP (VSW+VBP) and less than or equal to a sum of VSW, VBP and VAC (VSW+VBP+VAC), the plurality of pulses of the second enable signal V_DE (i.e., a third enable signal VT1_DE) may be obtained. A width of each pulse of the second enable signal corresponds to the number of pulses of the second pixel clock signal corresponding to HAC. For example, an interval value between a value of the first row counter r_PA at a moment of a rising edge of a pulse of the second enable signal and a value of the first row counter r_PA at a moment of a falling edge of the pulse is HAC. For example, a duration of a low level signal between two adjacent pulses in the plurality of pulses of the second enable signal is equal to a duration corresponding to (HBP+HAP+HSW). For example, referring to FIG. 13A, in a case where the third frame synchronization signal VT1_VS serves as the second frame synchronization signal V_VS, the obtained third enable signal VT1_DE serves as the second enable signal V_DE. For example, in a case where the third frame synchronization signal serves as the second frame synchronization signal, an obtained third horizontal synchronization signal may serve as a second horizontal synchronization signal. HSW' represents the number of pixel clock cycles corresponding to an effective width of a pulse of a horizontal to synchronization signal (e.g., the second horizontal synchronization signal, i.e., the third horizontal synchronization signal). For example, in a case where HTT' is 2202, HSW' is 44. In a single statistical cycle, in a case where the value of the first row counter r_PA is greater than a sum of HAC and HFP' (HAC+HFP') and less than or equal to a sum of HAC, HFP' and HSW' (HAC+HFP'+HSW'), the third horizontal synchronization signal is a high level signal. HFP' represents the number of pulses of the second pixel clock signal between a trailing edge of the pulse of the second enable signal and a leading edge of a pulse of the third horizontal synchronization signal. HAC represents the number of pixel clock cycles corresponding to all pixels in a row of pixels in the display module (e.g., the number of pulses of the second pixel clock signal). For example, for the case where the resolution of the display module is 1920×1080, the first frame rate is 59.94 Hz, HAC is 1920, HTT' is 2202, HFP' is 89, HSW' is 44 and HBP' is 149. HBP' represents the number of pulses of the second pixel clock signal between a trailing edge of the pulse of the third horizontal synchronization signal and a leading edge of the pulse of the second enable signal.

For another example, for a case where the fourth frame synchronization signal serves as the second frame synchronization signal, within a single statistical cycle, i.e., within a pulse cycle of the second frame synchronization signal (i.e., the fourth frame synchronization signal), in a case where the value of the second column counter r_LB is greater than the sum of VSW and VBP (VSW+VBP) and less than or equal to the sum of VSW, VBP and VAC (VSW+VBP+VAC), the plurality of pulses of the second enable signal V_DE (i.e., the fourth enable signal VT2_DE) may be obtained. The width of each pulse of the second enable signal corresponds to the number of pulses of the second pixel clock signal corresponding to HAC. For example, an interval value between a value of the second row counter r_PB at a moment of a rising edge of a pulse of the second enable signal and a value of the second row counter r_PB at a moment of a falling edge of the pulse is HAC. For example, a duration of a low level signal between two adjacent pulses in the plurality of pulses of the second enable signal is equal to a duration corresponding to (HBP+HAP+HSW). For example, referring to FIG. 13B, in a case where the fourth frame synchronization signal VT2_VS serves as the second frame synchronization signal V_VS, the obtained fourth enable signal VT2_DE serves as the second enable signal V_DE. For example, in a case where the fourth frame synchronization signal serves as the second frame synchronization signal, an obtained fourth horizontal synchronization signal may serve as the second horizontal synchronization signal. HSW represents the number of pixel clock cycles corresponding to an effective width of a pulse of a horizontal synchronization signal (e.g., the second horizontal synchronization signal, i.e., the fourth horizontal synchronization signal). In a single statistical cycle, in a case where the value of the second row counter r_PB is greater than a sum of HAC and HFP (HAC+HFP) and less than or equal to a sum of HAC, HFP and HSW (HAC+HFP+HSW), the fourth horizontal synchronization signal is a high level signal. HFP represents the number of pulses of the second pixel clock signal between a trailing edge of the pulse of the second enable signal and a leading edge of a pulse of the fourth horizontal synchronization signal. HAC represents the number of pixel clock cycles corresponding to all pixels in a row of pixels in the display module (e.g., the number of pulses of the second pixel clock signal). For example, for the case where the resolution of the display module is 1920×1080, the first frame rate is 60 Hz, HAC is 1920, HTT is 2200, HFP is 88, HSW is 44 and HBP is 148. HBP represents the number of pulses of the second pixel clock signal between a trailing edge of the pulse of the fourth horizontal synchronization signal and a leading edge of the pulse of the second enable signal.

For example, the signal processing device may include a write controller (WDMA) and a read controller (RDMA). The write controller is used to control the video data to be written into the storage device; and the read controller is used to control the video data to be read from the storage device. The signal processing device may further include a read-write controller (MIG) and a bus arbiter (AXI Interconnect). The read-write controller may be used to control a timing of reading and writing the video data to the storage device. For example, the read-write controller may be used to control a timing of writing the video data into the storage device by the write controller, and control a timing of reading the video data from the storage device by the read controller, so as to avoid mutual interference between writing the video data and reading the video data. The signal processing device may exchange data with the storage device through the bus arbiter. For example, the first timing signal generator and the second timing signal generator may be included in the read controller.

In some embodiments, the signal processing method further includes: outputting the second video signal. It will be understood that the signal processing device outputs the second video signal to the display module, and the display module may display images corresponding to the second video signal. For example, the signal processing device may output the second video signal to the display module through a high-definition digital display interface (V-by-One (VBO)). For example, the signal processing device may include the VBO interface. For example, the display module includes a timing controller and a display panel, and the timing controller controls the display panel to display images corresponding to the video data according to the second synchronization signal and the video data in the second video signal. During a time period when the signal processing device obtains a single frame of the video signal, the video data in the video signal output by the signal processing device is video data in a previous frame of video signal of the input one frame of video signal.

In this case, the signal processing device outputs a single frame of video signal during a time period when the signal processing device obtains a single frame of video signal, which may eliminate an accumulation of errors of the input frames and the output frames, so that the input frame and the output frame of the signal processing device may achieve single frame synchronization. In this case, it is possible to avoid unsynchronization of the input frame and the output frame, and it is also possible to avoid a situation where the time delay of the input frame video signal and output frame video signal of the signal processing device and a length of the time delay is continuously accumulated with the increase of the number of frames to result in frame skipping or a difference of at least one frame between the output frame and the input frame. In this way, it is possible to avoid a problem that an error occurs between the video signal output by the signal processing device to the display module and the video signal received by the signal processing device, the accuracy of the images displayed by the display module is reduced and the authenticity of the displayed images is influenced.

In addition, before the signal processing device starts to perform signal processing, the signal processing device may be reset (i.e., initialized) by a reset signal to avoid noise signal interference.

Figure 14:
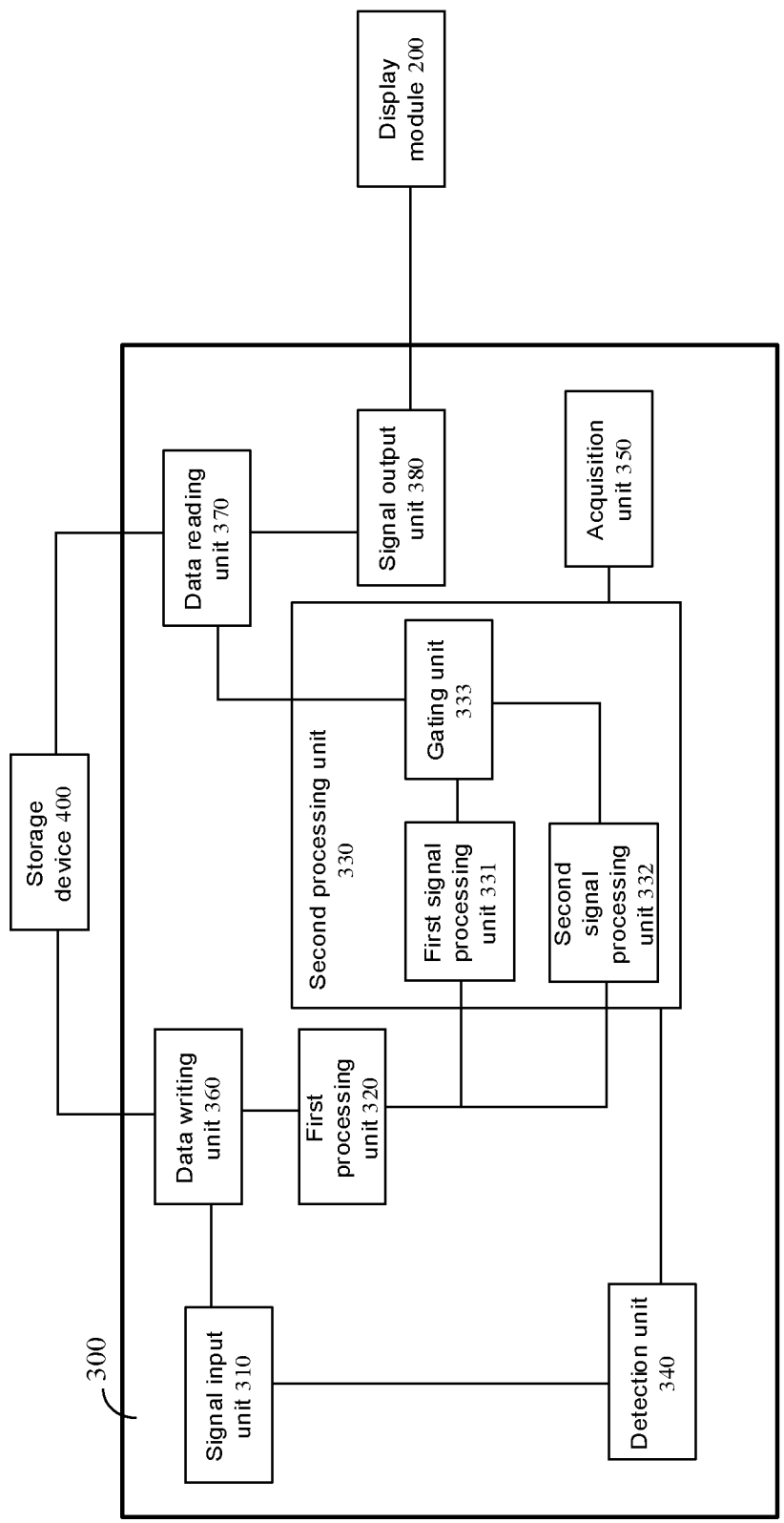
FIG. 14 is a block diagram of another signal processing device, in accordance with some embodiments.

Embodiments of the present disclosure provide a signal processing device. The signal processing device may implement the signal processing method as described in any one of the above embodiments. As shown in FIG. 14, the signal processing device 300 includes a signal input unit 310, a first processing unit 320 and a second processing unit 330.

The signal input unit is configured to obtain a first frame synchronization signal. The first frame synchronization signal includes a plurality of first pulses. A period between a trailing edge of a first pulse and a leading edge of a next first pulse of the first pulse is a first time period, and the first time period corresponds to a first integer number of pulses of a first pixel clock signal.

The first processing unit is configured to generate a synchronization calibration signal. The synchronization calibration signal includes a plurality of second pulses, and a width of a second pulse is equal to a pulse width of a second pixel clock signal. A triggering edge of the second pulse is delayed compared to the trailing edge of the first pulse, and a delay time is less than or equal to a sum of a pulse width of the first pixel clock signal and a clock cycle of the second pixel clock signal.

The second processing unit is configured to generate a second frame synchronization signal. The second frame synchronization signal includes a plurality of third pulses. A period between a triggering edge of each second pulse and a leading edge of a third pulse closest to the second pulse and after the second pulse is a second time period.

In a case where a ratio of a frequency of the second pixel clock signal to a frequency of the first pixel clock signal is within a threshold range, the second time period corresponds to a second integer number of pulses of the second pixel clock signal, and the second integer is an integer value of a product of the first integer and the ratio. Alternatively, in a case where the frequency of the first pixel clock signal is equal to the frequency of the second pixel clock signal, the second time period corresponds to a first integer number of pulses of the second pixel clock signal.

In some embodiments, as shown in FIG. 14, the second processing unit 330 includes: a first signal processing unit 331, a second signal processing unit 332 and a gating unit 333.

The first signal processing unit is configured to generate a third frame synchronization signal. A period between the triggering edge of each second pulse and a leading edge of a pulse, closest to the second pulse and after the second pulse, of a third frame synchronization signal corresponds to the second integer number of pulses of the second pixel clock signal.

The second signal processing unit is configured to generate a fourth frame synchronization signal. A period between the triggering edge of each second pulse and a leading edge of a pulse, closest to the second pulse and after the second pulse, of a fourth frame synchronization signal corresponds to the first integer number of pulses of the second pixel clock signal.

The gating unit is configured to select the third frame synchronization signal as the second frame synchronization signal in a case where a first condition is met, and to select the fourth frame synchronization signal as the second frame synchronization signal in a case where a second condition is met.

The first condition is that the ratio of the frequency of the second pixel clock signal to the frequency of the first pixel clock signal is within the threshold range, or a ratio of a second frame rate of a display module to a first frame rate of a first video signal is within the threshold range. The second condition is that the frequency of the first pixel clock signal is equal to the frequency of the second pixel clock signal, or the first frame rate of the first video signal is equal to the second frame rate of the display module.

In some embodiments, the signal input unit is configured to obtain the first video signal. The first video signal includes the first frame synchronization signal and video data.

In some embodiments, as shown in FIG. 14, the signal processing device 300 further includes: a detection unit 340, an acquisition unit 350, a data writing unit 360, a data reading unit 370 and a signal output unit 380.

The detection unit is configured to detect the first frame rate of the obtained first video signal. The acquisition unit is configured to obtain the second frame rate of the display module. The data writing unit is configured to write the video data in the first video signal into a storage device. The data reading unit is configured to read the video data in the storage device according to the second frame synchronization signal to obtain a second video signal. The second video signal includes the second frame synchronization signal and the video data. The signal output unit is configured to output the second video signal.

Embodiments of the signal processing device described in FIG. 14 are merely exemplary. For example, division of the above units is merely a logical function division and there may be other divisions in actual implementation. For example, a plurality of modules or assemblies may be combined or may be integrated into another system, or some features may be omitted or not executed. The functional units in the embodiments of the present application may be integrated into a single processing module or may be separate physical units, or two or more units may be integrated into a single module. The above units in FIG. 14 may be implemented in a form of hardware or software functional units. For example, when implemented in software, the first processing unit and the second processing unit (for example, the second processing unit includes the first signal processing unit, the second signal processing unit and the gating unit) may be implemented by a software functional module generated after at least one processor reads program codes stored in the memory. The above units in FIG. 14 may also be implemented by different hardware in a computer (a display apparatus). For example, the signal input unit, the first processing unit and the second processing unit are implemented by a part of processing resources in at least one processor (e.g., one core or two cores in a multi-core processor), while the detection unit, the acquisition unit, the data writing unit, the data reading unit and the signal output unit are implemented by the remaining part of processing resources in at least one processor (e.g., other cores in the multi-core processor). For example, it is implemented in the form of hardware. For example, the above signal processing device may be a programmable device, such as a hardware programmable device, such as a field programmable gate array (FPGA). In this case, the first processing unit, the second processing unit, the first signal processing unit, the second signal processing unit, the gating unit, the signal input unit, the detection unit, the acquisition unit, the data writing unit, the data reading unit and the signal output unit in the signal processing device may each include a configurable logic module (CLB), and different units are coupled through internal connection lines. Obviously, the above functional units may also be implemented by means of a combination of software and hardware. For example, the signal input unit, the data writing unit, the data reading unit and the signal output unit are implemented by hardware circuits, while the first processing unit and the second processing unit are implemented by software functional modules generated after the CPU reads the program codes stored in the memory.

For more details of the units (e.g., the signal input unit, the first processing unit, the second processing unit, etc.) in FIG. 14 implementing the above functions, reference may be made to the descriptions in the foregoing method embodiments, which will not be repeated herein.

All the embodiments in the present description are described in an incremental manner. The same or similar parts among all the embodiments are referred to each other. Each embodiment focuses on differences between the embodiment and other embodiments.

The above embodiments may be implemented in whole or in part through software, hardware, firmware, or any combination thereof. When the above embodiments are implemented by using a software program, the software program may be implemented in a form of a computer program product in whole or in part. The computer program product includes one or more computer instructions. When the computer instruction(s) are loaded and executed on a computer, processes or functions according to the embodiments of the present disclosure are generated in whole or in part. The computer may be a general-purpose computer, a dedicated computer, a computer network or any other programmable device. The computer instruction(s) may be stored in a computer-readable storage medium. The computer readable storage medium may be any available medium that may be accessed by the computer, or a data storage device, such as a server including one or more available media, a data center including one or more available media, etc. The available medium may be a magnetic medium (e.g., a floppy disk, a magnetic tape or a magnetic tape), an optical medium (e.g., a digital versatile disk (DVD)) or a semiconductor medium (e.g., a solid state drive (SSD)), or the like.

It will be noted that beneficial effects of the signal processing device as described above are the same as the beneficial effects of the signal processing method as described in some of the above embodiments, which will not be repeated herein.

Some embodiments of the present disclosure provide a computer-readable storage medium (e.g., a non-transitory computer-readable storage medium). The computer-readable storage medium has stored therein computer program instructions that, when run on a computer, cause the computer to execute the signal processing method as described in any one of the above embodiments, e.g., one or more steps in the signal processing method.

For example, the computer-readable storage medium may include, but is not limited to a magnetic storage device (e.g., a hard disk, a floppy disk or a magnetic tape), an optical disk (e.g., a compact disk (CD), a digital versatile disk (DVD)), a smart card and a flash memory device (e.g., an erasable programmable read-only memory (EPROM), a card, a stick or a key driver). Various computer-readable storage medium described in the present disclosure may represent one or more devices and/or other machine-readable storage media for storing information. The term "machine-readable storage medium" may include, but is not limited to, wireless channels and various other media capable of storing, containing and/or carrying instructions and/or data.

Some embodiments of the present disclosure also provide a computer program product. The computer program product includes computer program instructions that, when executed on a computer, cause the computer to execute the signal processing method as described in the above embodiments, e.g., one or more steps in the signal processing method.

Some embodiments of the present disclosure also provide a computer program. When executed on the computer, the computer program causes the computer to execute the signal processing method as described in the above embodiments, e.g., one or more steps in the signal processing method.

Beneficial effects of the computer-readable storage medium, the computer program product and the computer program are the same as the beneficial effects of the signal processing method as described in some of the above embodiments, which will not be described herein again.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A signal processing method, comprising:
   obtaining a first frame synchronization signal, the first frame synchronization signal including a plurality of first pulses, wherein a period between a trailing edge of a first pulse and a leading edge of a next first pulse of the first pulse is a first time period, and the first time period corresponds to a first integer number of pulses of a first pixel clock signal;
   generating a synchronization calibration signal, the synchronization calibration signal including a plurality of second pulses, wherein a width of a second pulse is equal to a pulse width of a second pixel clock signal; a triggering edge of the second pulse is delayed compared to a trailing edge of a first pulse closest thereto, and a delay time is less than or equal to a sum of a pulse width of the first pixel clock signal and a clock cycle of the second pixel clock signal; and
   generating a second frame synchronization signal, the second frame synchronization signal including a plurality of third pulses, wherein a period between a triggering edge of each second pulse and a leading edge of a third pulse closest to the second pulse and after the second pulse is a second time period;
   wherein in a case where a ratio of a frequency of the second pixel clock signal to a frequency of the first pixel clock signal is within a threshold range, the second time period corresponds to a second integer number of pulses of the second pixel clock signal; and the second integer is an integer value of a product of the first integer and the ratio.

2. The signal processing method according to claim 1, wherein
   in a case where the ratio of the frequency of the second pixel clock signal to the frequency of the first pixel clock signal is 1, the second time period corresponds to a first integer number of pulses of the second pixel clock signal.

3. The signal processing method according to claim 1, wherein generating the second frame synchronization signal, includes:
   generating a third frame synchronization signal, a period between the triggering edge of each second pulse and a leading edge of a pulse, closest to the second pulse and after the second pulse, of the third frame synchronization signal corresponding to the second integer number of pulses of the second pixel clock signal;
   generating a fourth frame synchronization signal, a period between the triggering edge of each second pulse and a leading edge of a pulse, closest to the second pulse and after the second pulse, of the fourth frame synchronization signal corresponding to a first integer number of pulses of the second pixel clock signal; and
   selecting one of the third frame synchronization signal and the fourth frame synchronization signal as the second frame synchronization signal, including:
      selecting the third frame synchronization signal as the second frame synchronization signal in a case where a first condition is met, the first condition being that the ratio of the frequency of the second pixel clock signal to the frequency of the first pixel clock signal is within the threshold range that does not contain 1, or a ratio of a second frame rate of a display module to a first frame rate of a first video signal is within the threshold range that does not contain 1; and selecting the fourth frame synchronization signal as the second frame synchronization signal in a case where a second condition is met, the second condition being that the frequency of the first pixel clock signal is equal to the frequency of the second pixel clock signal, or the first frame rate of the first video signal is equal to the second frame rate of the display module.

4. The signal processing method according to claim 3, further comprising:

detecting the first frame rate of the obtained first video signal; and obtaining the second frame rate of the display module.

5. The signal processing method according to claim 3, wherein generating the third frame synchronization signal, includes:

counting a number of pulses of the second pixel clock signal;

generating the leading edge of the pulse of the third frame synchronization signal in a case where the number of pulses of the second pixel clock signal reaches the second integer; and generating a trailing edge of the pulse of the third frame synchronization signal, includes:

generating the trailing edge of the pulse of the third frame synchronization signal, and returning to perform an operation of counting the number of pulses of the second pixel clock signal in response to the triggering edge of the second pulse, in a case where the number of pulses of the second pixel clock signal does not reach a third integer, the third integer being greater than the second integer; or generating the trailing edge of the pulse of the third frame synchronization signal, and returning to perform an operation of counting the number of pulses of the second pixel clock signal in response to a case where the number of pulses of the second pixel clock signal reaches a third integer, the third integer being greater than the second integer; and re-returning to perform the operation of counting the number of pulses of the second pixel clock signal in response to the triggering edge of the second pulse.

6. The signal processing method according to claim 1, wherein generating the synchronization calibration signal, includes:

generating a calibration signal, the calibration signal including a plurality of fourth pulses, wherein one of a leading edge and a trailing edge of a fourth pulse is at a same time as a trailing edge of a first pulse; a width of the fourth pulse is equal to the pulse width of the first pixel clock signal; and obtaining the synchronization calibration signal according to the calibration signal, wherein the second pulses of the synchronization calibration signal are delayed compared to the fourth pulses of the calibration signal, and a delay time is less than or equal to the clock cycle of the second pixel clock signal.

7. The signal processing method according to claim 6, wherein obtaining the synchronization calibration signal according to the calibration signal, includes:

generating a first signal, a leading edge of a pulse of the first signal being at a same time as a trailing edge of the fourth pulse of the calibration signal;

generating a second signal, pulses of the second signal being delayed by a third time period compared to pulses of the first signal, and the third time period being less than or equal to the clock cycle of the second pixel clock signal;

generating a third signal, pulses of the third signal being delayed by a fourth time period compared to the pulses of the second signal, and the fourth time period being equal to the pulse width of the second pixel clock signal; and obtaining the synchronization calibration signal according to the second signal and the third signal.

8. The signal processing method according to claim 7, wherein obtaining the synchronization calibration signal according to the second signal and the third signal, includes:

performing a first logic operation on the second signal and the third signal to obtain the synchronization calibration signal.

9. The signal processing method according to claim 6, wherein generating the calibration signal, includes:

generating a fourth signal, the fourth signal and the first frame synchronization signal being mutually inverted signals;

generating a fifth signal, the fifth signal being delayed by the pulse width of the first pixel clock signal compared to the first frame synchronization signal; and obtaining the calibration signal according to the fourth signal and the fifth signal.

10. The signal processing method according to claim 9, wherein obtaining the calibration signal according to the fourth signal and the fifth signal, includes:

performing a second logic operation on the fourth signal and the fifth signal to obtain the calibration signal.

11. The signal processing method according to claim 1, wherein obtaining the first frame synchronization signal, includes:

obtaining a first video signal, the first video signal including the first frame synchronization signal and video data; and the signal processing method further comprises:

writing the video data into a storage device;

reading the video data in the storage device to obtain a second video signal according to the second frame synchronization signal, the second video signal including the second frame synchronization signal and the video data; and outputting the second video signal.

12. A signal processing device, comprising:

a memory having stored therein one or more computer programs; and a processor coupled to the memory, the processor being configured to execute the one or more computer programs to cause the processor to implement the signal processing method according to claim 1.

13. A signal processing device, wherein the signal processing device is a chip, and the chip is configured to implement the signal processing method according to claim 1.

14. A non-transitory computer-readable storage medium having stored a computer program instructions, wherein the computer program, when executed by a computer, causes the computer to perform the signal processing method according to claim 1.

15. The signal processing method according to claim 1, wherein the threshold range is from 0.9 to 1.1, inclusive, and does not contain 1.

16. The signal processing method according to claim 3, wherein generating the fourth frame synchronization signal, includes:
- counting a number of pulses of the second pixel clock signal;
- generating the leading edge of the pulse of the fourth frame synchronization signal in a case where the number of pulses of the second pixel clock signal reaches the first integer; and
- generating a trailing edge of the pulse of the fourth frame synchronization signal, includes:
  - generating the trailing edge of the pulse of the fourth frame synchronization signal, and returning to perform an operation of counting the number of pulses of the second pixel clock signal in response to the triggering edge of the second pulse, in a case where the number of pulses of the second pixel clock signal does not reach a fourth integer, the fourth integer being greater than the first integer; or
  - generating the trailing edge of the pulse of the fourth frame synchronization signal, and returning to perform an operation of counting the number of pulses of the second pixel clock signal in response to a case where the number of pulses of the second pixel clock signal reaches a fourth integer, the fourth integer being greater than the first integer; and re-returning to perform the operation of counting the number of pulses of the second pixel clock signal in response to the triggering edge of the second pulse.

17. The signal processing method according to claim 8, wherein the first logic operation is an exclusive OR operation.

18. The signal processing method according to claim 10, wherein the second logic operation is an AND operation.

19. A display apparatus, comprising:
- a display module; and
- a signal processing device coupled to the display module, the signal processing device being configured to:
  - obtain a first frame synchronization signal, the first frame synchronization signal including a plurality of first pulses, wherein a period between a trailing edge of a first pulse and a leading edge of a next first pulse of the first pulse is a first time period, and the first time period corresponds to a first integer number of pulses of a first pixel clock signal;
  - generate a synchronization calibration signal, the synchronization calibration signal including a plurality of second pulses, wherein a width of a second pulse is equal to a pulse width of a second pixel clock signal; a triggering edge of the second pulse is delayed compared to a trailing edge of a first pulse closest thereto, and a delay time is less than or equal to a sum of a pulse width of the first pixel clock signal and a clock cycle of the second pixel clock signal;
  - generate a second frame synchronization signal, the second frame synchronization signal including a plurality of third pulses, wherein a period between a triggering edge of each second pulse and a leading edge of a third pulse closest to the second pulse and after the second pulse is a second time period; and
  - output a second video signal to the display module;
  - wherein in a case where a ratio of a frequency of the second pixel clock signal to a frequency of the first pixel clock signal is within a threshold range, the second time period corresponds to a second integer number of pulses of the second pixel clock signal, and the second integer is an integer value of a product of the first integer and the ratio; and in a case where the ratio of the frequency of the second pixel clock signal to the frequency of the first pixel clock signal is 1, the second time period corresponds to a first integer number of pulses of the second pixel clock signal.

20. The display apparatus according to claim 19, further comprising:
- a storage device coupled to the signal processing device, wherein
- the storage device is configured to store video data in a first video signal.

* * * * *